(12) United States Patent
Gong et al.

(10) Patent No.: US 12,063,132 B2
(45) Date of Patent: Aug. 13, 2024

(54) DATA PROCESSING METHOD AND APPARATUS

(71) Applicant: HUAWEI TECHNOLOGIES CO., LTD., Guangdong (CN)

(72) Inventors: Mingxin Gong, Beijing (CN); Bingyu Qu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 301 days.

(21) Appl. No.: 17/731,188

(22) Filed: Apr. 27, 2022

(65) Prior Publication Data
US 2022/0255781 A1 Aug. 11, 2022

Related U.S. Application Data

(63) Continuation of application No. PCT/CN2020/124676, filed on Oct. 29, 2020.

(30) Foreign Application Priority Data

Oct. 31, 2019 (CN) .......................... 201911057386.9

(51) Int. Cl.
H04L 27/26 (2006.01)
(52) U.S. Cl.
CPC ...... *H04L 27/2607* (2013.01); *H04L 27/2613* (2013.01); *H04L 27/26524* (2021.01)
(58) Field of Classification Search
CPC ... H04J 13/0062; H04J 13/10; H04L 27/2607; H04L 27/2613; H04L 27/26524; H04L 27/26035; H04W 74/008; H04W 74/085
See application file for complete search history.

(56) References Cited

U.S. PATENT DOCUMENTS

2015/0365977 A1  12/2015  Tabet et al.

FOREIGN PATENT DOCUMENTS

| CN | 102333060 A | 1/2012 | |
|---|---|---|---|
| CN | 108040366 A | 5/2018 | |
| CN | 108271271 A | * 7/2018 | ............ H04W 74/00 |
| CN | 108271271 A | 7/2018 | |
| EP | 3782414 A1 | 2/2021 | |

(Continued)

OTHER PUBLICATIONS

PCT International Search Report and Written Opinion issued in International Application No. PCT/CN2020/124676 on Jan. 18, 2021, 15 pages (with English translation).

(Continued)

*Primary Examiner* — Melvin C Marcelo
*Assistant Examiner* — Natali Pascual Peguero
(74) *Attorney, Agent, or Firm* — Fish & Richardson P.C.

(57) ABSTRACT

Embodiments of this application disclose example data processing methods and example apparatuses. One example method includes determining, by a first terminal device based on a parameter group, a first sequence including N elements, where the parameter group includes a first parameter, a second parameter, and a cyclic shift value, the first sequence is obtained by performing cyclic shift on a second sequence based on the cyclic shift value, and the second sequence is determined based on the first parameter and the second parameter. The first terminal device can then send a signal to a network device based on the first sequence.

20 Claims, 5 Drawing Sheets

(56) References Cited

FOREIGN PATENT DOCUMENTS

EP            4057761 A1    9/2022
WO     2019223857 A1    11/2019

OTHER PUBLICATIONS

Huawei et al., "PRACH Preamble Sequences for NR," 3GPP TSG RAN WG1 Meeting #88bis, R1-1705055, Spokance, USA, Apr. 3-7, 2017, 18 pages.

Extended European Search Report in European Appln No. 20880637.2, dated Oct. 24, 2022, 6 pages.

* cited by examiner

DATA PROCESSING METHOD AND APPARATUS

CROSS-REFERENCE TO RELATED APPLICATIONS

This application is a continuation of International Application No. PCT/CN2020/124676, filed on Oct. 29, 2020, which claims priority to Chinese Patent Application No. 201911057386.9, filed on Oct. 31, 2019. The disclosures of the aforementioned applications are hereby incorporated by reference in their entireties.

TECHNICAL FIELD

This application relates to the field of communication technologies, and in particular, to a data processing method and an apparatus.

BACKGROUND

As a quantity of terminals rapidly increases, a base station can simultaneously perform uplink and downlink data transmission with a plurality of terminals. For example, in a multi-user multiple-input multiple-output (MU-MIMO) technology, a base station can perform uplink and downlink data transmission with a plurality of terminals by using a same time-frequency resource. This helps improve a system capacity.

Before the uplink and downlink data transmission is performed between the plurality of terminals and the base station, the plurality of terminals need to send different random access channel (RACH) signals to the base station. After detecting the RACH signals separately sent by the plurality of terminals, the base station may complete access of the plurality of terminals. When the base station receives a signal including a Zadoff-Chu sequence (ZC sequence for short), it may indicate that the base station receives a RACH signal sent by a terminal. The ZC sequence is obtained by performing cyclic shift on a root sequence. An element in the root sequence satisfies the following relation:

$$x_u(i) = e^{-j\frac{\pi u i(i+1)}{N_{ZC}}},$$

where u is a physical root sequence number; i is an index of the element in the root sequence, where a value of i ranges from 0 to $N_{ZC}-1$; $x_u(i)$ is a value of the element whose index of the element is i in the root sequence; $N_{ZC}$ is a length of the ZC sequence; and j is a symbol of an imaginary number in a complex number.

However, a quantity of root sequences obtained based on the foregoing relation is small, and a quantity of ZC sequences obtained is accordingly small. As a quantity of terminal devices accessing a cell increases, there is an increasing probability of a conflict between the terminal devices in a random access process.

SUMMARY

Embodiments of this application provide a data processing method and an apparatus, to help obtain a large quantity of different first sequences, and further reduce a probability of a conflict between terminal devices in a random access process.

According to a first aspect, an embodiment of this application provides a data processing method. The method includes: A first terminal device determines, based on a parameter group, a first sequence including N elements, where the parameter group includes a first parameter, a second parameter, and a cyclic shift value, the first sequence is obtained by performing cyclic shift on a second sequence based on the cyclic shift value, and the second sequence is determined based on the first parameter and the second parameter. The first terminal device sends a signal to a network device based on the first sequence, where an element in the second sequence satisfies:

$$x_{u_1,u_2}(i) = \alpha e^{j2\pi\left(\frac{u_1 (i\bmod P)^3 + u_2 (i\bmod P)}{P} + \varphi\right)}; \text{ or}$$

$$x_{u_1,u_2}(i) = \alpha e^{-j2\pi\left(\frac{u_1 (i\bmod P)^3 + u_2 (i\bmod P)}{P} + \varphi\right)},$$

where $u_1$ is the first parameter, where $u_1 \in \{1, 2, \ldots, P-1\}$; $u_2$ is the second parameter, where $u_2 \in \{0, 1, 2, \ldots, P-1\}$; i is an index of the element in the second sequence, where a value of i ranges from 0 to $N-1$; $x_{u_1,u_2}(i)$ is a value of the element whose index of the element is i in the second sequence; N is a length of the second sequence; j is a symbol of an imaginary number in a complex number; P and N satisfy any one of the following relationships: P is a minimum prime number greater than or equal to N, P is a maximum prime number less than or equal to N, P is a minimum prime number greater than 2×N, or P is a maximum prime number less than 2×N; $\alpha$ is a non-zero complex number; and $\varphi$ is a real number.

In this technical solution, $(P*(P-1))$ different second sequences may be obtained by changing a value of $u_1$ or $u_2$. Compared with a conventional technology in which different second sequences may be obtained by changing a value of only one parameter, in this embodiment of this application, different second sequences may be obtained by changing a value of any parameter of $u_1$ or $u_2$. It can be learned that more different second sequences may be obtained based on the relation that the element in the second sequence satisfies provided in this embodiment of this application. Further, more different first sequences may be obtained, which helps reduce a probability of a conflict between terminal devices in a random access process. In addition, the first sequence may be further allocated to more terminal devices for use, which helps increase a quantity of terminal devices that may access a cell.

In an implementation, when both the first parameter and the second parameter are the same as a first parameter and a second parameter that are used by the second terminal device, an absolute value of a difference between the cyclic shift value and a cyclic shift value used by the second terminal device may be greater than a first value, where the first terminal device and the second terminal device are located in a same cell.

In this technical solution, it can be ensured that signals separately sent by the first terminal device and the second terminal device are different when reaching the network device. Therefore, the network device can distinguish between the signals sent by the first terminal device and the second terminal device, to avoid a conflict between the first terminal device and the second terminal device.

In an implementation, when the first parameter is the same as a first parameter used by a third terminal device, an absolute value of a difference between the second parameter used by the first terminal device and a second parameter used by the third terminal device may be greater than a second value, where the first terminal device and the third terminal device are located in a same cell.

In this technical solution, the second value may be determined based on a maximum Doppler frequency shift of the cell. In this manner, it can be ensured that in the case of different Doppler frequency shifts of different terminal devices, the network device can still distinguish between signals sent by the different terminal devices.

In an implementation, the method may further include: The first terminal device receives the parameter group sent by the network device.

In an implementation, the method may further include: The first terminal device receives a first parameter group set sent by the network device, and determines the parameter group in the first parameter group set.

In an implementation, in the first parameter group set, an absolute value of a difference between cyclic shift values in any two parameter groups that have same first parameters and same second parameters is greater than the first value.

In this technical solution, when a plurality of terminal devices share the first parameter group set, different terminal devices select different parameter groups in the first parameter group set, separately generate a signal based on the selected parameter group, and send the signal to the network device, so that the following case can be avoided: The network device fails, resulting from a shift caused in a transmission process, to distinguish between the signals sent by the different terminal devices.

In an implementation, in the first parameter group set, an absolute value of a difference between second parameters in any two parameter groups that have same first parameters is greater than the second value.

In an implementation, the first parameter group set is included in a second parameter group set, and the second parameter group set is included in a candidate parameter group set. The candidate parameter group set includes one or more parameter group subsets, a parameter group in each parameter group subset in the candidate parameter group set has a same first parameter, any two parameter groups that belong to different parameter group subsets in the candidate parameter group set have different first parameters, each parameter group subset in the candidate parameter group set includes a parameter groups, and the second parameter group set includes b parameter groups. When b≤a, the b parameter groups are any b parameter groups in any parameter group subset in the candidate parameter group set; and/or when b>a, the b parameter groups include a parameter group in c parameter group subsets and d parameter groups, the c parameter group subsets are any c parameter group subsets in the candidate parameter group set, and the d parameter groups are any d parameter groups in any parameter group subset other than the c parameter group subsets in the candidate parameter group set.

In this technical solution, a cell corresponding to the network device can preferably use a parameter group in a same parameter group subset.

In an implementation, the first terminal device may specifically send the signal to the network device based on the first sequence in the following implementation: The first terminal device performs fast Fourier transform on the first sequence to obtain a frequency domain sequence; maps the frequency domain sequence to a subcarrier to obtain the signal; and sends the signal to the network device.

According to a second aspect, an embodiment of this application provides another data processing method. The method includes: A network device determines, based on a parameter group, a first sequence including N elements, where the parameter group includes a first parameter, a second parameter, and a cyclic shift value, the first sequence is obtained by performing cyclic shift on a second sequence based on the cyclic shift value, and the second sequence is determined based on the first parameter and the second parameter. The network device receives a first signal, and determines, based on the first sequence and the first signal, whether the first signal includes a signal sent based on the first sequence, where an element in the second sequence satisfies:

$$x_{u_1,u_2}(i) = \alpha e^{j2\pi\left(\frac{u_1(i \bmod P)^3 + u_2(i \bmod P)}{P} + \varphi\right)}; \text{ or}$$

$$x_{u_1,u_2}(i) = \alpha e^{-j2\pi\left(\frac{u_1(i \bmod P)^3 + u_2(i \bmod P)}{P} + \varphi\right)},$$

where $u_1$ is the first parameter, where $u_1 \in \{1, 2, \ldots, P-1\}$; $u_2$ is the second parameter, where $u_2 \in \{0, 1, 2, \ldots, P-1\}$; i is an index of the element in the second sequence, where a value of i ranges from 0 to N−1; $x_{u_1,u_2}(i)$ is a value of the element whose index of the element is i in the second sequence; N is a length of the second sequence; j is a symbol of an imaginary number in a complex number; P and N satisfy any one of the following relationships: P is a minimum prime number greater than or equal to N, P is a maximum prime number less than or equal to N, P is a minimum prime number greater than 2×N, or P is a maximum prime number less than 2×N; α is a non-zero complex number; and φ is a real number.

In an implementation, the method may further include: The network device separately sends a parameter group to a first terminal device and a second terminal device. When both a first parameter and a second parameter in the parameter group sent to the first terminal device are the same as a first parameter and a second parameter in the parameter group sent to the second terminal device, an absolute value of a difference between a cyclic shift value in the parameter group sent to the first terminal device and a cyclic shift value in the parameter group sent to the second terminal device is greater than a first value, where the first terminal device and the second terminal device are located in a same cell.

In this technical solution, it can be ensured that signals separately sent by the first terminal device and the second terminal device are different when reaching the network device. Therefore, the network device can distinguish between the signals sent by the first terminal device and the second terminal device, to avoid a conflict between the first terminal device and the second terminal device.

In an implementation, the method may further include: The network device separately sends a parameter group to the first terminal device and a third terminal device. When the first parameter in the parameter group sent to the first terminal device is the same as a first parameter in the parameter group sent to the third terminal device, an absolute value of a difference between the second parameter in the parameter group sent to the first terminal device and a second parameter in the parameter group sent to the third terminal device is greater than a second value, where the first terminal device and the second terminal device are located in a same cell.

In this technical solution, the second value may be determined based on a maximum Doppler frequency shift of the cell. In this manner, it can be ensured that in the case of different Doppler frequency shifts of different terminal devices, the network device can still distinguish between signals sent by the different terminal devices.

In an implementation, the method may further include: The network device sends a first parameter group set to the first terminal device, and determines the parameter group in a second parameter group set, where the first parameter group set is included in the second parameter group set.

In an implementation, in the first parameter group set, an absolute value of a difference between cyclic shift values in any two parameter groups that have same first parameters and same second parameters is greater than the first value.

In this technical solution, when a plurality of terminal devices share the first parameter group set, different terminal devices select different parameter groups in the first parameter group set, separately generate a signal based on the selected parameter group, and send the signal to the network device, so that the following case can be avoided: The network device fails, resulting from a shift caused in a transmission process, to distinguish between the signals sent by different terminal devices.

In an implementation, in the first parameter group set, an absolute value of a difference between second parameters in any two parameter groups that have same first parameters is greater than the second value.

In an implementation, the second parameter group set is included in a candidate parameter group set. The candidate parameter group set includes one or more parameter group subsets, a parameter group in each parameter group subset in the candidate parameter group set has a same first parameter, any two parameter groups that belong to different parameter group subsets in the candidate parameter group set have different first parameters, each parameter group subset in the candidate parameter group set includes a parameter groups, and the second parameter group set includes b parameter groups. When b≤a, the b parameter groups are any b parameter groups in any parameter group subset in the candidate parameter group set, and/or when b>a, the b parameter groups include a parameter group in c parameter group subsets and d parameter groups, the c parameter group subsets are any c parameter group subsets in the candidate parameter group set, and the d parameter groups are any d parameter groups in any parameter group subset other than the c parameter group subsets in the candidate parameter group set.

In this technical solution, a cell corresponding to the network device can preferably use a parameter group in a same parameter group subset.

In an implementation, the network device may specifically determine, based on the first sequence and the first signal, whether the first signal includes the signal sent based on the first sequence in the following implementation: The network device performs inverse fast Fourier transform on a frequency domain sequence carried by a subcarrier in the first signal to obtain a time domain sequence; performs correlation processing on the first sequence and the time domain sequence to obtain a correlation value; and determines, based on the correlation value, whether the first signal includes the signal sent based on the first sequence.

According to a third aspect, an embodiment of this application provides a sequence-based signal transmission apparatus. The apparatus is a first terminal device or an apparatus (for example, a chip) having a function of the first terminal device. The apparatus has a function of implementing the data processing method provided in the first aspect. The function is implemented by hardware or by hardware executing corresponding software. The hardware or the software includes one or more modules corresponding to the function.

According to a fourth aspect, an embodiment of this application provides another sequence-based signal transmission apparatus. The apparatus is a network device or an apparatus (for example, a chip) having a function of the network device. The apparatus has a function of implementing the data processing method provided in the second aspect. The function is implemented by hardware or by hardware executing corresponding software. The hardware or the software includes one or more modules corresponding to the function.

According to a fifth aspect, an embodiment of this application provides still another sequence-based signal transmission apparatus. The apparatus is a first terminal device or an apparatus (for example, a chip) having a function of the first terminal device. The apparatus includes a processor and a storage medium. The storage medium stores instructions. When the instructions are run by the processor, the apparatus is enabled to implement the data processing method provided in the first aspect.

According to a sixth aspect, an embodiment of this application provides still another sequence-based signal transmission apparatus. The apparatus is a network device or an apparatus (for example, a chip) having a function of the network device. The apparatus includes a processor and a storage medium. The storage medium stores instructions. When the instructions are run by the processor, the apparatus is enabled to implement the data processing method provided in the second aspect.

According to a seventh aspect, an embodiment of this application provides a computer-readable storage medium. The computer-readable storage medium is configured to store computer program instructions used by the sequence-based signal transmission apparatus described in the third aspect, and includes a program for performing the method in the first aspect.

According to an eighth aspect, an embodiment of this application provides a computer-readable storage medium. The computer-readable storage medium is configured to store computer program instructions used by the sequence-based signal transmission apparatus described in the fourth aspect, and includes a program for performing the method in the second aspect.

According to a ninth aspect, an embodiment of this application provides a computer program product, where the program product includes a program. When the program is executed by a sequence-based signal transmission apparatus, the apparatus is enabled to implement the method described in the first aspect.

According to a tenth aspect, an embodiment of this application provides a computer program product, where the program product includes a program. When the program is executed by a sequence-based signal transmission apparatus, the apparatus is enabled to implement the method described in the second aspect.

DESCRIPTION OF EMBODIMENTS

To better understand a data processing method disclosed in embodiments of this application, the following first describes a communication system to which embodiments of this application are applicable.

Figure 1:
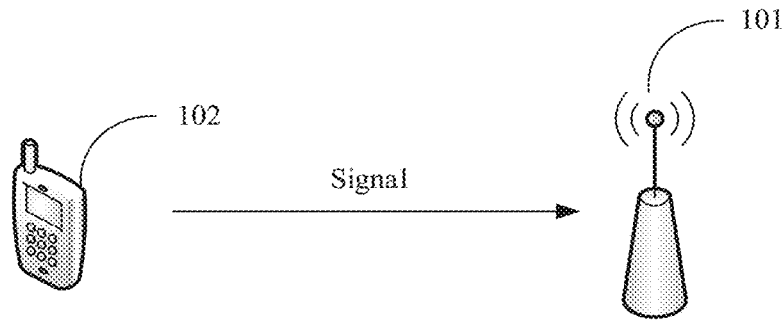
FIG. 1 is a schematic diagram of an architecture of a communication system according to an embodiment of this application.

FIG. 1 is a schematic diagram of an architecture of a communication system disclosed in embodiments of this application. As shown in FIG. 1, the communication system includes a network device 101 and a first terminal device 102. The first terminal device 102 is a terminal device located within coverage of a cell corresponding to the network device 101.

The first terminal device 102 may determine, based on a parameter group, a first sequence including N elements, and send a signal to the network device 101 based on the first sequence. The network device 101 may also determine the first sequence based on the parameter group, and after receiving a first signal, determine, based on the first sequence and the first signal, whether the first signal includes the signal sent based on the first sequence.

It should be noted that the network device 101 can receive the first signal regardless of whether the first terminal device 102 sends the signal to the network device 101. If the first terminal device 102 sends the signal to the network device 101, the first signal received by the network device 101 may include the signal sent by the first terminal device 102. Optionally, the first signal may further include a noise signal and/or a signal sent by another terminal device to the network device 101. If the first terminal device 102 does not send the signal to the network device 101, the first signal received by the network device 101 does not include the signal sent by the first terminal device 102. Optionally, the first signal may include a noise signal and/or a signal sent by another terminal device to the network device 101.

It should be further noted that the communication system shown in FIG. 1 includes only one terminal device (namely, the first terminal device 102), which is merely used as an example, and does not constitute any limitation on embodiments of this application. In an implementation, in addition to the first terminal device 102, another terminal device may be further included in the communication system shown in FIG. 1, where the another terminal device is also located within the coverage of the cell corresponding to the network device 101. When the communication system corresponding to the network device 101 includes a plurality of terminal devices (for example, a signal sent by the first terminal device 102 and a second terminal device), the first terminal device 102 and the second terminal device (which is not shown in FIG. 1) may separately determine a corresponding first sequence, and separately send a signal to the network device 101 based on the corresponding first sequence. For example, the first terminal device 102 corresponds to a first sequence a, and the second terminal device corresponds to a first sequence b. Correspondingly, the first signal received by the network device 101 may include a signal 1 and a signal 2. The signal 1 is a signal sent by the first terminal device 102 based on the first sequence a, and the signal 2 is a signal sent by the second terminal device based on the first sequence b. The first sequence a is different from the first sequence b. The first sequence a may be for determining whether the first signal received by the network device 101 includes the signal 1 sent based on the first sequence a. Similarly, the first sequence b may be for determining whether the first signal received by the network device 101 includes the signal 2 sent based on the first sequence b.

The parameter group includes a first parameter, a second parameter, and a cyclic shift value, where the first sequence may be obtained by performing cyclic shift on a second sequence based on the cyclic shift value. The second sequence is determined based on the first parameter and the second parameter, where an element in the second sequence satisfies:

$$x_{u_1,u_2}(i) = \alpha e^{j2\pi\left(\frac{u_1(i\bmod P)^3 + u_2(i\bmod P)}{P} + \varphi\right)}; \text{ or}$$

$$x_{u_1,u_2}(i) = \alpha e^{-j2\pi\left(\frac{u_1(i\bmod P)^3 + u_2(i\bmod P)}{P} + \varphi\right)},$$

where
$u_1$ is the first parameter, where $u_1 \in \{1, 2, \ldots, P-1\}$; $u_2$ is the second parameter, where $u_2 \in \{0, 1, 2, \ldots, P-1\}$; i is an index of the element in the second sequence, where a value of i ranges from 0 to N−1; $x_{u_1,u_2}(i)$ is a value of the element whose index of the element is i in the second sequence; N is a length of the second sequence; j is a symbol of an imaginary number in a complex number; P is a prime number; α is a non-zero complex number; φ is a real number; and P and N satisfy any one of the following relationships: P is a minimum prime number greater than or equal to N, P is a maximum prime number less than or equal to N, P is a minimum prime number greater than 2×N, or P is a maximum prime number less than 2×N.

The data processing method in embodiments of this application may be applied to a random access process or a process of uplink and downlink data transmission between a network device and a terminal device. When the method is applied to the random access process, the network device 101 may determine, based on the first sequence, whether the received first signal includes a RACH signal. When the first signal includes A different RACH signals, it may indicate that A different terminal devices need to access the network device 101.

Similarly, when the method is applied to the process of uplink and downlink data transmission between a network device and a terminal device, if the first signal received by the network device includes B different data signals (or control signals), it may indicate that the network device receives signals sent by B different terminal devices. Further, the network device may further perform channel estimation on a channel between the network device and the terminal device based on information exchanged between the network device and the terminal device. A and B are positive integers.

The network device 101 may be an entity configured to transmit or receive a signal on a network side. For example, the network device 101 may be an access network device (for example, a base station). The first terminal device 102 and the second terminal device may be entities configured to receive or transmit a signal on a user side. Specifically, the first terminal device 102 and the second terminal device each may be user equipment (UE), a remote terminal, a mobile terminal, a wireless communication device, a user apparatus, or the like. The user equipment may be a mobile phone, a desktop computer, a notebook computer, another wearable device, or the like.

It may be understood that the communication system described in embodiments of this application is intended to describe the technical solutions in embodiments of this application more clearly, but does not constitute any limitation on the technical solutions provided in embodiments of this application. A person of ordinary skill in the art may learn that, with evolution of a system architecture and emergence of a new service scenario, the technical solutions provided in embodiments of this application are also applicable to resolving a similar technical problem.

With reference to the accompanying drawings, the following describes in detail a data processing method and a sequence-based signal transmission apparatus that are provided in this application.

Figure 2:
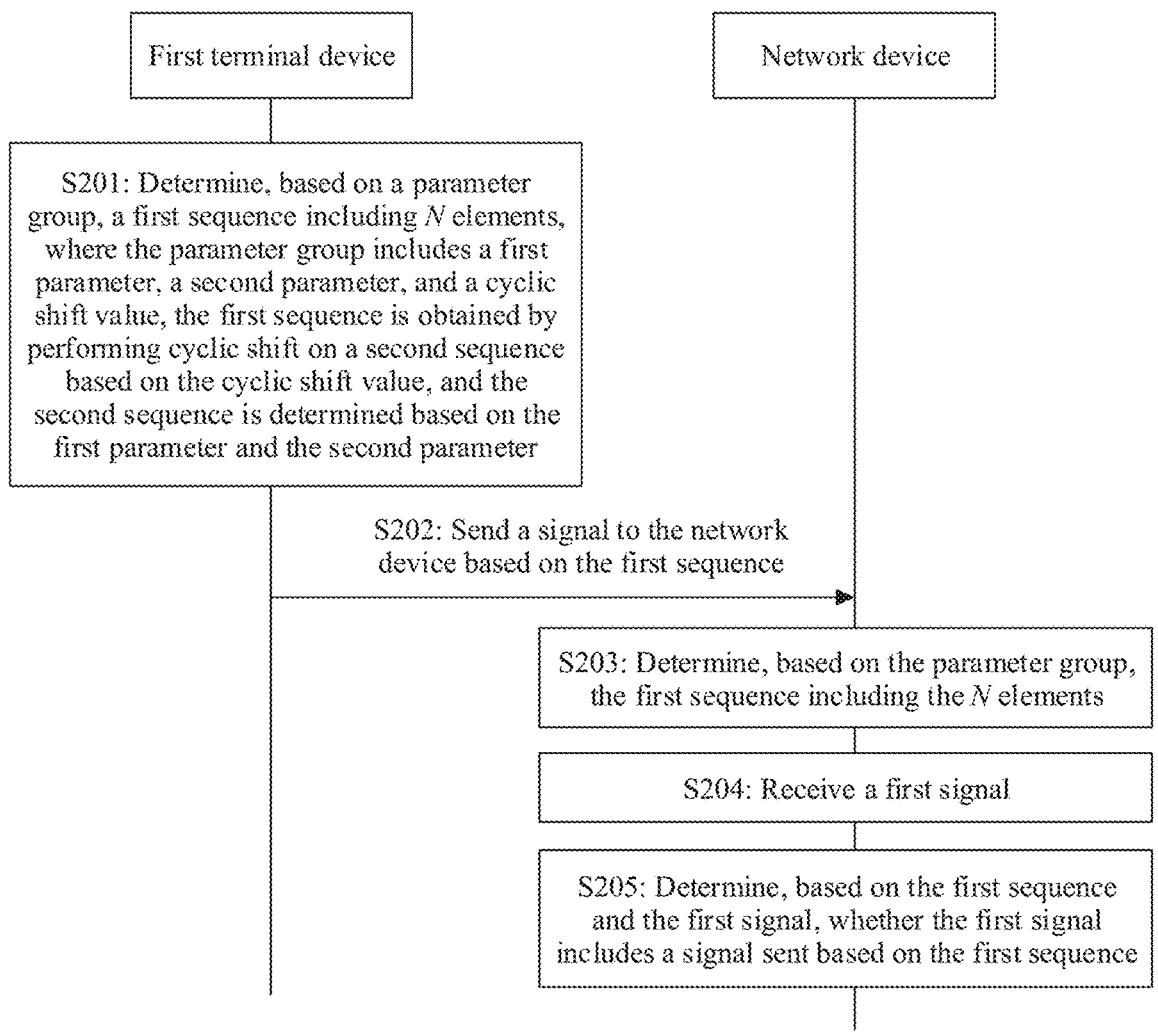
FIG. 2 is a schematic flowchart of a data processing method according to an embodiment of this application.

FIG. 2 is a schematic flowchart of a data processing method according to an embodiment of this application. Step S201 and step S202 are performed by a first terminal device or a chip in the first terminal device, and step S203 to step S205 are performed by a network device or a chip in the network device. The following uses an example in which the data processing method is performed by the first terminal device and the network device for description. As shown in FIG. 2, the method may include but is not limited to the following steps:

Step S201: The first terminal device determines, based on a parameter group, a first sequence including N elements, where the parameter group includes a first parameter, a second parameter, and a cyclic shift value, the first sequence is obtained by performing cyclic shift on a second sequence based on the cyclic shift value, and the second sequence is determined based on the first parameter and the second parameter, where an element in the second sequence satisfies:

$$x_{u_1,u_2}(i) = \alpha e^{j2\pi\left(\frac{u_1(i \bmod P)^3 + u_2(i \bmod P)}{P} + \varphi\right)}; \text{ or}$$

$$x_{u_1,u_2}(i) = \alpha e^{-j2\pi\left(\frac{u_1(i \bmod P)^3 + u_2(i \bmod P)}{P} + \varphi\right)},$$

where
$u_1$ is the first parameter, where $u_1 \in \{1, 2, \ldots, P-1\}$; $u_2$ is the second parameter, where $u_2 \in \{0, 1, 2, \ldots, P-1\}$; i is an index of the element in the second sequence, where a value of i ranges from 0 to N−1; $x_{u_1,u_2}(i)$ is a value of the element whose index of the element is i in the second sequence; N is a length of the second sequence; j is a symbol of an imaginary number in a complex number; P is a prime number; —α is a non-zero complex number; φ is a real number; and mod is a modulo operation.

P is a length of an original sequence, where both N and P are positive integers. The second sequence including N elements may be obtained based on the relation that the element in the second sequence satisfies and the original sequence including P elements. In this embodiment of this application, P and N may satisfy any one of the following relationships: P is a minimum prime number greater than or equal to N, P is a maximum prime number less than or equal to N, P is a minimum prime number greater than 2×N, P is a maximum prime number less than 2×N, P is a minimum prime number greater than N/2, or P is a maximum prime number less than N/2. It can be learned from the relationship satisfied between P and N that N may be a value close to or equal to P, to be specific, N may be greater than P, or may be less than P. Alternatively, N may be a value close to 2P, or N may be a value close to P/2 (when P/2 is an integer). It can be learned from the relationship satisfied between P and N that there is a small difference between the length of the second sequence and the length of the original sequence. In this manner, the second sequence may still have a sequence feature of the original sequence. Optionally, N may be 139, 839, or another value.

It can be learned from the relation that the element in the second sequence satisfies that (P*(P−1)) different second sequences may be obtained by changing a value of $u_1$ or $u_2$. Compared with the conventional technology in which different second sequences may be obtained by changing a value of only one parameter, in this embodiment of this application, different second sequences may be obtained by changing a value of any parameter of $u_1$ or $u_2$. It can be learned that more different second sequences may be obtained based on the relation that the element in the second sequence satisfies provided in this embodiment of this application. Further, more different first sequences may be obtained, which helps reduce a probability of a conflict between terminal devices in a random access process. In addition, the first sequence may be further allocated to more terminal devices for use, which helps increase a quantity of terminal devices that may access a cell.

In this embodiment of this application, an element in the first sequence satisfies:

$$x_{u_1,u_2,v}(n) = x_{u_1,u_2}((n+C_v) \bmod N), n=0,1,2,\ldots,N-1.$$

In the relation that the element in the first sequence satisfies, n is an index of the element in the first sequence; N is the length of the second sequence; $C_v$ is the cyclic shift value in a sequence group; and v is an index of $C_v$. The relation that the element in the first sequence satisfies indicates that a value of the element whose index of the element is n in the first sequence is obtained by performing cyclic shift by ((n+$C_v$)mod N) bits (for example, to the left or to the right) on a value of an element whose index of the element is n in the second sequence. For example, if the second sequence is 0110, the cyclic shift is performed on the second sequence by 1 bit to the left, 2 bits to the left, and 3 bits to the left, to obtain sequences 1100, 1001, and 0011 respectively. v different first sequences may be obtained by performing v times of cyclic shift on the second sequence, where a quantity of bits shifted each time is different. For another example, when the second sequence is 0110, $C_0=1$, and $C_1=3$, in a case in which $x_{u_1,u_2,0}(0)=x_{u_1,u_2}((0+C_0)\bmod 4)=x_{u_1,u_2}((1)\bmod 4)=x_{u_1,u_2}(1)=1$, a value of an element whose index of the element is 0 in the first sequence is obtained by performing cyclic shift by 1 bit to the left on a value of an element whose index of the element is 0 in the second sequence; or in a case in which $x_{u_1,u_2,1}(0)=x_{u_1,u_2}((0+C_1)\bmod 4)=x_{u_1,u_2}((3)\bmod 4)=x_{u_1,u_2}(3)=0$, a value of an element whose index of the element is 0 in the first sequence is obtained by performing cyclic shift by 3 bits to the left on a value of an element whose index of the element is 0 in the second sequence.

In an implementation, $C_v \in \{0, 1, 2, \ldots, N-1\}$, where actual values of $C_v$ may be discontinuous, but values of v may be continuous. Specifically, a value set of $C_v$ may include $\lfloor N/L \rfloor$ values in $\{0, 1, 2, \ldots, N-1\}$, where v is an index of $C_v$ in the value set, and a range of the value of v is $[0, \lfloor N/L \rfloor -1]$. A difference between values of $C_v$ corresponding to any two values of v is greater than or equal to L. In other words, a difference between any two cyclic shift values is greater than or equal to L. $\lfloor \ \rfloor$ represents a rounding down symbol, and $\lfloor N/L \rfloor$ represents a maximum integer that is not greater than N/L. For example, when N is 51 and L is 10, $C_v \in \{0, 1, 2, \ldots, 50\}$ and $\lfloor N/L \rfloor = 5$. To be specific, the value set of $C_v$ includes five values, the range of the value of v is [0, 4], and the value set of $C_v$ includes $C_0$, $C_1$, $C_2$, $C_3$, and $C_4$. Specifically, $C_0$, $C_1$, $C_2$, $C_3$, and $C_4$ are 0, 10, 20, 30, and 40 respectively. It should be noted that, in the foregoing example, the value of $C_0$ being 0 is merely an example. In another possible implementation, the value of $C_0$ may alternatively be any value ranging from 1 to 9, and values of $C_1$, $C_2$, $C_3$, and $C_4$ in the value set of $C_v$ may be accordingly determined based on the value of $C_0$.

In this embodiment of this application, the parameter group may be protocol-agreed. In an implementation, the parameter group may be sent to the first terminal device by the network device. It should be noted that the network device may send the parameter group to the first terminal device, or may send indication information to the first terminal device in a plurality of manners to indicate the parameter group. For example, the network device sends information including the parameter group to the first terminal device, and the first terminal device may extract the parameter group from the information.

In an implementation, P, $\alpha$, and $\varphi$ may all be protocol-agreed, or may be user-defined. This is not limited in embodiments of this application. A sequence (for example, the first sequence and the second sequence) mentioned in embodiments of this application may be an object (or an element or an event) that is arranged in a column, where the object (or the element or the event) in the sequence may be a character or a frequency point. This is not limited in embodiments of this application.

Step S202: The first terminal device sends a signal to the network device based on the first sequence.

In this embodiment of this application, after determining the first sequence, the first terminal device may send the signal to the network device based on the first sequence.

In an implementation, the first terminal device may specifically send the signal to the network device based on the first sequence in the following implementation: The first terminal device performs fast Fourier transform on the first sequence to obtain a frequency domain sequence; maps the frequency domain sequence to a subcarrier to obtain the signal; and sends the signal to the network device.

The first sequence is a sequence in time domain. The first sequence in time domain can be transformed into a sequence in frequency domain (namely, a frequency domain sequence) by performing fast Fourier transform (FFT) on the first sequence. It should be noted, that the first terminal device performs FFT on the first sequence is merely an example and does not constitute any limitation on this embodiment of this application. In another possible implementation, the first terminal device may alternatively perform discrete Fourier transform (DFT) on the first sequence, to transform the first sequence in time domain to a sequence in frequency domain.

Step S203: The network device determines, based on the parameter group, the first sequence including the N elements.

An execution process in which the network device determines, based on the parameter group, the first sequence including the N elements is the same as an execution process in which the first terminal device determines, based on the parameter group, the first sequence including the N elements. For an execution process of step S203, refer to specific description of step S201. Details are not described herein again.

In an implementation, the network device may separately send a parameter group to the first terminal device and a second terminal device, where at least one of a first parameter and a second parameter in the parameter group sent to the first terminal device is different from a first parameter and a second parameter in the parameter group sent to the second terminal device. In an implementation, when both the first parameter and the second parameter in the parameter group sent to the first terminal device are the same as the first parameter and the second parameter in the parameter group sent to the second terminal device, an absolute value of a difference between a cyclic shift value in the parameter group sent to the first terminal device and a cyclic shift value in the parameter group sent to the second terminal device is greater than a first value (that is, L), where the first terminal device and the second terminal device are different terminal devices located in a same cell.

When the first value is the same as a second value, generated second sequences are the same. However, when different terminal devices use a same first sequence, a conflict occurs. Therefore, first sequences used by the first terminal device and the second terminal device are obtained by performing cyclic shift on the second sequence by different bits, so that the first sequences used by the first terminal device and the second terminal device may be different. However, a signal sent based on a first sequence may change in a transmission process. Specifically, a distance between the first terminal device and the network device may be different from a distance between the second terminal device and the network device. Therefore, transmission delays required for signals sent to the network device by the first terminal device and the second terminal device to reach the network device are different. When there is a small difference between the cyclic shift value used by the first terminal device and the cyclic shift value used by the second terminal device, due to a transmission delay difference, the signals transmitted by the two terminal devices may be the same when reaching the network device. Consequently, the network device cannot distinguish between the signal transmitted by the first terminal device and the signal transmitted by the second terminal device. In other words, when the network device receives a signal sent by a terminal device (namely, the first terminal device or the second terminal device), a first sequence in the signal is shifted. For example, the first terminal device sends a signal 1 to the network device based on a first sequence. After transmission, a signal that is sent by the first terminal device and that is received by the network device is a signal 2. A sequence obtained based on the signal 2 is a sequence obtained by shifting (due to transmission) the first sequence in the signal 1.

In an implementation, a shift occurred on the first sequence in the transmission process is less than or equal to the first value. Therefore, when both the first parameter and the second parameter in the parameter group sent to the first terminal device are the same as the first parameter and the second parameter in the parameter group sent to the second terminal device, the absolute value of the difference between the cyclic shift value in the parameter group sent to the first terminal device and the cyclic shift value in the parameter group sent to the second terminal device is greater than the first value (that is, L), so that the following case can be avoided: The network device cannot distinguish between the signals separately sent by the first terminal device and the second terminal device when receiving the signals separately sent by the first terminal device and the second terminal device. For example, a signal sent by the first terminal device is a signal 3, a signal sent by the second terminal device is a signal 4, a signal that is received by the network device (and that is sent by the first terminal device) is a signal 5, and a signal that is received by the network device (and that is sent by the second terminal device) is a signal 6. The signal 3 and the signal 4 are obtained based on a same $u_1$, a same $u_2$, and different cyclic shift values, where a difference between a cyclic shift value x1 corresponding to the signal 3 and a cyclic shift value x2 corresponding to the signal 4 is greater than L. Because a shift occurred on a signal in the transmission process is less than or equal to L, a difference between a cyclic shift value x3 corresponding to the signal 5 and a cyclic shift value x4 corresponding to the signal 6 is greater than 0. Therefore, the network device can distinguish between the signal 5 and the signal 6.

In an implementation, the first value may be determined based on a radius of the cell in which the first terminal device and the second terminal device are located, or the first value may be determined based on a largest value of multipath delays corresponding to the cell. Specifically, when the first terminal device does not receive time advance (TA) information, the first value is determined based on a largest value of transmission delays in the cell, where the largest value of transmission delays in the cell may be determined based on the radius of the cell. When the first terminal device receives the TA information, the first value is determined based on the largest value of the multipath delays corresponding to the cell.

In an implementation, the network device may separately send a parameter group to the first terminal device and a third terminal device. When the first parameter in the parameter group sent to the first terminal device is the same as a first parameter in the parameter group sent to the third terminal device, an absolute value of a difference between the second parameter in the parameter group sent to the first terminal device and a second parameter in the parameter group sent to the third terminal device is greater than the second value, where the first terminal device and the third terminal device are different terminal devices located in a same cell. Optionally, the first terminal device, the second terminal device, and the third terminal device are located in the same cell.

In an implementation, the second value may be determined based on a largest value (for example, d) of Doppler frequency shifts corresponding to the cell in which the first terminal device and the third terminal device are located, or the second value may be determined based on d and a spacing (for example, $\nabla f$) between carriers for carrying the signal sent by the first terminal device (or a signal sent by the third terminal device). For example, the second value is $2\lceil d/\nabla f \rceil$ or $\lceil 2*d/\nabla f \rceil$. $\lceil \ \rceil$ represents a rounding up symbol. In this manner, it can be ensured that in the case of different Doppler frequency shifts of different terminal devices, the network device can still distinguish between signals sent by the different terminal devices.

Step S204: The network device receives a first signal.

Specifically, the network device may receive the first signal on a preset time-frequency resource. It should be noted that the network device can receive the first signal regardless of whether the first terminal device sends the signal to the network device. In an implementation, the first signal may include the signal sent by the first terminal device, a signal sent by another terminal device (for example, the second terminal device or the third terminal device); and/or a noise signal. When the first signal includes the signal sent by the first terminal device and the signal sent by the another terminal device, the first signal may be a mixed signal including the signal sent by the first terminal device and the signal sent by the another terminal device.

In an implementation, the preset time-frequency resource may be configured based on an application scenario. For example, when this embodiment of this application is applied to the random access process, the preset time-frequency resource may be a time-frequency resource used by the network device to monitor a random access request.

Step S205: The network device determines, based on the first sequence and the first signal, whether the first signal includes a signal sent based on the first sequence.

Specifically, after receiving the first signal, the network device may determine, based on the determined first sequence and the first signal, whether the first signal includes the signal sent based on the first sequence.

In an implementation, the network device may specifically determine, based on the first sequence and the first signal, whether the first signal includes the signal sent based on the first sequence in the following implementation: The network device performs inverse fast Fourier transform (IFFT) on a frequency domain sequence carried by a subcarrier in the first signal to obtain a time domain sequence; performs correlation processing on the first sequence and the time domain sequence to obtain a correlation value; and determines, based on the correlation value, whether the first signal includes the signal sent based on the first sequence. In an implementation, the correlation processing may be specifically performed on the first sequence and the time domain sequence to obtain the correlation value in the following implementation: The network device determines, based on the first sequence and a possible cyclic shift that is caused during transmission, a sequence obtained by performing the possible cyclic shift (caused during transmission) on the first sequence; and correlates the sequence with the time domain sequence to obtain a group of correlation values. Correspondingly, whether the first signal includes the signal sent based on the first sequence may be specifically determined based on the based on the correlation value in the following implementation: The network device performs normalization processing (for example, noise normalization processing) on the group of correlation values, to obtain a group of normalized correlation values, and the network device determines that the first signal includes the signal sent based on the first sequence if a largest value in the group of normalized correlation values is greater than a preset threshold. In an implementation, if the largest value in the group of normalized correlation values is less than or equal to the preset threshold, the network device determines that the first signal does not include the signal sent based on the first sequence.

When this embodiment of this application is applied to the random access process, that the network device determines that the first signal includes the signal sent based on the first sequence may indicate that the network device receives a random access request sent by a terminal device. Further, the network device may determine a distance between the terminal device that sends the random access request and the network device based on a possible cyclic shift that is caused during transmission and that corresponds to the largest value in the foregoing group of correlation values. Further, the network device may determine a TA value based on the distance, and send the TA value to the terminal device (that sends the random access request). In an implementation, the network device may determine, based on a preset correspondence between a cyclic shift value and a distance, the distance between the terminal device that sends the random access request and the network device. In an implementation, in the correspondence, a smaller cyclic shift value corresponds to a shorter distance.

It should be noted that, when the cell corresponding to the first terminal device includes a plurality of terminal devices, the network device may determine a plurality of first sequences. The plurality of first sequences are first sequences (namely, first sequences that may be included in signals sent by the terminal devices in the cell) that may be used by a terminal device in a cell corresponding to the network device. For example, when the cell corresponding to the network device includes three terminal devices (for example, the first terminal device, the second terminal device, and the third terminal device), the network device may determine three first sequences (for example, a first sequence a, a first sequence b, and a first sequence c). Whether the first signal includes a signal sent based on the first sequence a may be further determined by correlating the first sequence a with the first signal received by the network device. Similarly, whether the first signal includes a signal sent based on the first sequence b may be further determined by correlating the first sequence b with the first signal received by the network device. Similarly, whether the first signal includes a signal sent based on the first sequence c may be further determined by correlating the first sequence c with the first signal received by the network device.

The preset threshold may be set by the network device by default, or may be an empirical value entered by a user. Specifically, when lengths of the first sequences are different, the preset thresholds may be different.

It should be noted that an execution sequence of at least some of the foregoing steps is not limited. For example, step S203 may be performed before step S202. This is not limited in this embodiment of this application.

In this embodiment of this application, ($P*(P-1)$) different second sequences may be obtained by changing the value of $u_1$ or $u_2$. Compared with the conventional technology in which different second sequences may be obtained by changing a value of only one parameter, in this embodiment of this application, different second sequences may be obtained by changing the value of any parameter of $u_1$ or $u_2$. It can be learned that more different second sequences may be obtained based on the relation that the element in the second sequence satisfies provided in this embodiment of this application. Further, more different first sequences may be obtained, which helps reduce the probability of the conflict between the terminal devices in the random access process. In addition, the first sequence may be further allocated to more terminal devices for use, which helps increase the quantity of terminal devices that may access the cell.

Figure 3:
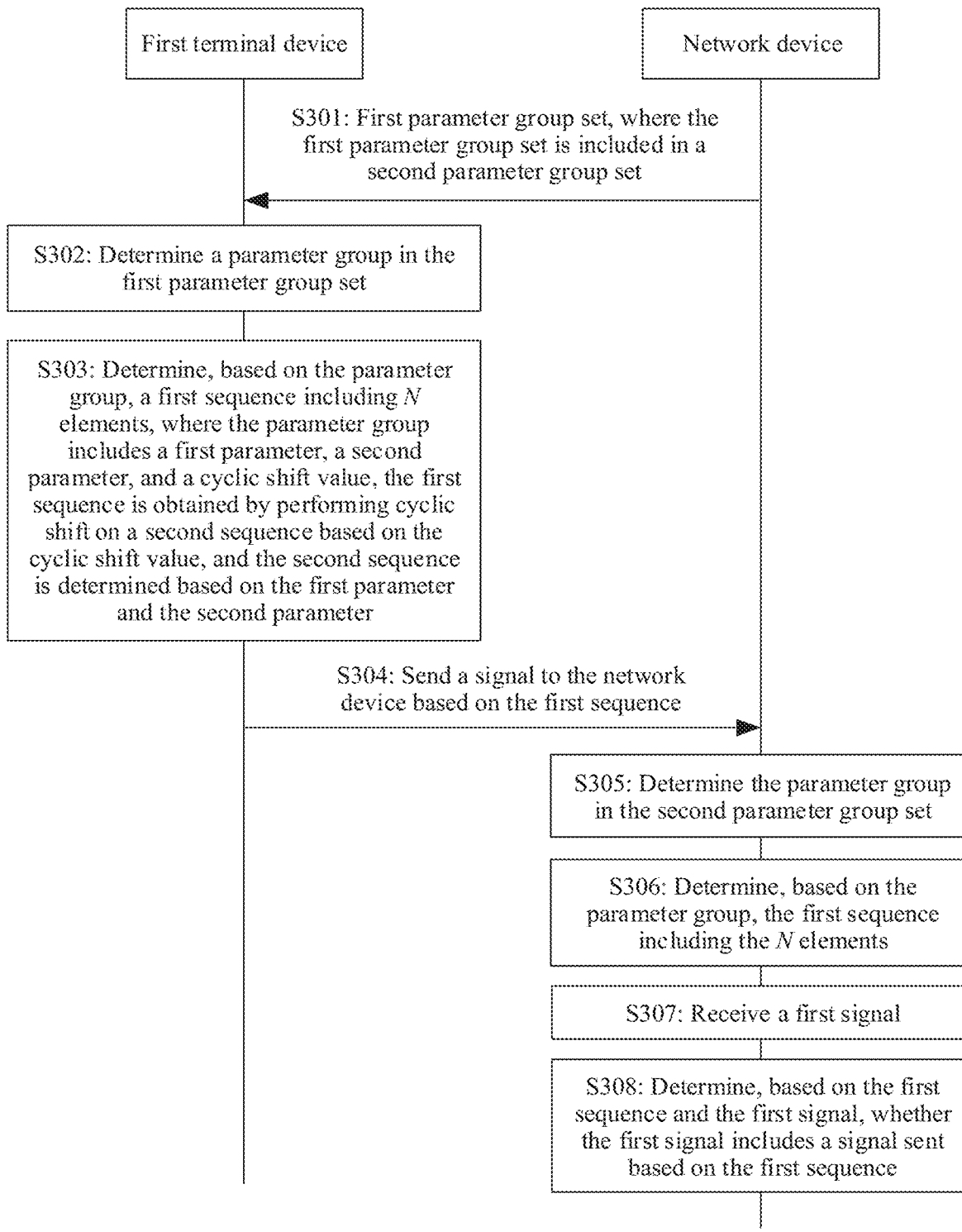
FIG. 3 is a schematic flowchart of another data processing method according to an embodiment of this application.

FIG. 3 is a schematic flowchart of another data processing method according to an embodiment of this application. In the method, that a network device configures a parameter group for a first terminal device by sending a first parameter group set to the first terminal device is described in detail. Step S302 to step S304 are performed by the first terminal device or a chip in the first terminal device, and step S301 and step S305 to step S308 are performed by the network device or a chip in the network device. The following uses an example in which the data processing method is performed by the first terminal device and the network device for description. The method may include but is not limited to the following steps.

Step S301: The network device sends the first parameter group set to the first terminal device, where the first parameter group set is included in a second parameter group set.

In this embodiment of this application, the network device may store the second parameter group set in advance, and a parameter group included in the second parameter group set may be allocated to a terminal device in a cell corresponding to the network device. Specifically, the network device may configure one or more parameter groups for one terminal device. In this case, the one or more parameter groups are available only to the terminal device. When the network device configures one parameter group for one terminal device and determines a first sequence a based on the parameter group, and when a first signal received by the network device includes a signal sent based on the first sequence a, it may indicate that the network device receives a signal sent by the terminal device. When the network device configures the first parameter group set for the terminal device, the first parameter group set includes a plurality of parameter groups (for example, four parameter groups). When a first sequence a to a first sequence d are respectively determined based on the four parameter groups, a signal sent based on any first sequence of the first sequence a to the first sequence d may represent two-bit information, and signals sent based on different first sequences of the first sequence a to the first sequence d may represent different information. For example, information represented by the signals sent based on the first sequence a to the first sequence d in the first sequences is 00, 01, 10, and 11 respectively. To be specific, when the first signal received by the network device includes the signal sent based on the first sequence d, it may indicate that the network device receives the signal sent by the terminal device, and the two-bit information included in the signal is 11. It can be learned that when more first sequences are generated, more first sequences may be configured for the terminal device, so that the signal sent by the terminal device to the network device based on the first sequence can carry more information.

In this embodiment of this application, the network device may further send the first parameter group set to a terminal device (for example, a second terminal device and a third terminal device) other than the first terminal device. In other words, the network device may send a same parameter group set to different terminal devices. In this case, the first parameter group set is shared by the first terminal device, the second terminal device, and the third terminal device. Correspondingly, the first terminal device, the second terminal device, and the third terminal device may separately determine a parameter group in the first parameter group set, separately determine a first sequence based on the parameter group, and send a signal to the network device based on the separately determined first sequence. When the first signal received by the network device includes the signal that corresponds to the first sequence determined based on the parameter group in the first parameter group set, the network device may determine that the signal sent by one of the first terminal device, the second terminal device, or the third terminal device is received, but cannot determine a specific terminal device. It should be noted that the first terminal device, the second terminal device, and the third terminal device may select different parameter groups, or may select a same parameter group. In an implementation, when the network device sends the same parameter group set to the different terminal devices, the parameter group set includes a large quantity of parameter groups.

In an implementation, the network device may send different parameter group sets to different terminal devices, and parameter groups included in the different parameter group sets are completely different. In this case, a parameter group set received by a terminal device is only available to the terminal device. When a first signal received by the network device includes a signal that corresponds to a first sequence determined based on a parameter group in the parameter group set, the network device may determine that a signal sent by the terminal device is received, and the signal further carries specific information. In an implementation, when the network device sends the different parameter group sets to the different terminal devices, the parameter group sets may include a small quantity of parameter groups.

In an implementation, in the first parameter group set, an absolute value of a difference between cyclic shift values in any two parameter groups that have same first parameters and same second parameters is greater than a first value. In this manner, when a plurality of terminal devices share the first parameter group set, different terminal devices select different parameter groups in the first parameter group set, separately generate a signal based on the selected parameter group, and send the signal to the network device, so that the following case can be avoided: The network device fails, resulting from a shift caused in a transmission process, to distinguish between the signals sent by the different terminal devices.

In an implementation, in the first parameter group set, an absolute value of a difference between second parameters in any two parameter groups that have same first parameters is greater than a second value. In this manner, when a plurality of terminal devices share the first parameter group set, different terminal devices select different parameter groups that are in the first parameter group set and that have the same first parameters, separately generate a signal based on the selected parameter group, and send the signal to the network device, so that it may be ensured that in different Doppler frequency shifts of the different terminal devices, the network device can still distinguish between the signals sent by the different terminal devices.

Step S302: The first terminal device determines a parameter group in the first parameter group set.

Specifically, after receiving the first parameter group set sent by the network device, the first terminal device may determine the parameter group in the first parameter group set. In an implementation, the first terminal device may randomly determine the parameter group in the first parameter group set, or may determine the parameter group in the first parameter group set in another manner preset by the first terminal device. Optionally, when different terminal devices share the first parameter group set, different terminal devices may determine parameter groups in the first parameter group set in different manners. In this manner, a probability that the parameter groups determined by different terminal devices in the first parameter group set are the same may be reduced, which helps reduce a probability of a conflict between different terminal devices.

Step S303: The first terminal device determines, based on the parameter group, a first sequence including N elements, where the parameter group includes a first parameter, a second parameter, and a cyclic shift value, the first sequence is obtained by performing cyclic shift on a second sequence based on the cyclic shift value, and the second sequence is determined based on the first parameter and the second parameter, where an element in the second sequence satisfies:

$$x_{u_1,u_2}(i) = \alpha e^{j2\pi\left(\frac{u_1(i \bmod P)^3 + u_2(i \bmod P)}{P} + \varphi\right)}; \text{ or}$$

$$x_{u_1,u_2}(i) = \alpha e^{-j2\pi\left(\frac{u_1(i \bmod P)^3 + u_2(i \bmod P)}{P} + \varphi\right)},$$

where $u_1$ is the first parameter, where $u_1 \in \{1, 2, \ldots, P-1\}$; $u_2$ is the second parameter, where $u_2 \in \{0, 1, 2, \ldots, P-1\}$; i is an index of the element in the second sequence, where a value of i ranges from 0 to N−1; $x_{u_1,u_2}(i)$ is a value of the element whose index of the element is i in the second sequence; N is a length of the second sequence; j is a symbol of an imaginary number in a complex number; $\alpha$ is a non-zero complex number; $\varphi$ is a real number; and P and N satisfy any one of the following relationships: P is a minimum prime number greater than or equal to N, P is a maximum prime number less than or equal to N, P is a minimum prime number greater than 2×N, or P is a maximum prime number less than 2×N.

Step S304: The first terminal device sends a signal to the network device based on the first sequence.

It should be noted that, for a process of performing step S303 and step S304, refer to the specific descriptions of step S201 and step S202 respectively in FIG. 2. Details are not described herein again.

Step S305: The network device determines the parameter group in the second parameter group set.

In this embodiment of this application, the parameter group in the second parameter group set may be allocated to the terminal device in the cell corresponding to the network device. Therefore, a signal sent by the terminal device in the cell to the network device may be generated based on a first sequence determined based on any parameter group in the second parameter group set. Therefore, the network device needs to traverse each first sequence determined based on the parameter group in the second parameter group set, to determine whether the signal sent by the terminal device in the cell corresponding to the network device is received.

In an implementation, if the second parameter group set includes a third parameter group set and a fourth parameter group set, where each parameter group in the third parameter group set is sent to the terminal device in the cell corresponding to the network device, and no parameter group in the fourth parameter group set is sent to the terminal device in the cell corresponding to the network device, the network device may determine the parameter group in the third parameter group set. It should be noted that a first sequence in a signal sent to the network device by any terminal device in the cell corresponding to the network device is determined based on a parameter group set received from the network device. Because no parameter group in the fourth parameter group set is sent to the terminal device in the cell corresponding to the network device, the signal sent by the terminal device in the cell to the network device is unlikely to be generated based on a first sequence determined based on the parameter group in the fourth parameter group set. The network device traverses each first sequence determined based on the parameter group in the third parameter group set, to determine whether the signal sent by the terminal device in the cell corresponding to the network device is received.

Step S306: The network device determines, based on the parameter group, the first sequence including the N elements.

Step S307: The network device receives the first signal.

Step S308: The network device determines, based on the first sequence and the first signal, whether the first signal includes a signal sent based on the first sequence.

It should be noted that, for a process of performing step S306 to step S308, refer to the specific descriptions of step S203 to step S205 respectively in FIG. 2. Details are not described herein again. It should be further noted that an execution sequence of at least some of the foregoing steps is not limited. For example, step S305 may be performed before step S304 (or step S302 or step S303). This is not limited in this embodiment of this application.

Through implementation of this embodiment of this application, the network device may send different parameter group sets to different terminal devices. The terminal device determines the first sequence based on the parameter group in the received parameter group set, and sends the signal to the network device based on the first sequence. This helps the network device determine whether the signal sent by the terminal device in the corresponding cell is received, and further determine specific information carried in the signal sent by the terminal device.

Figure 4:
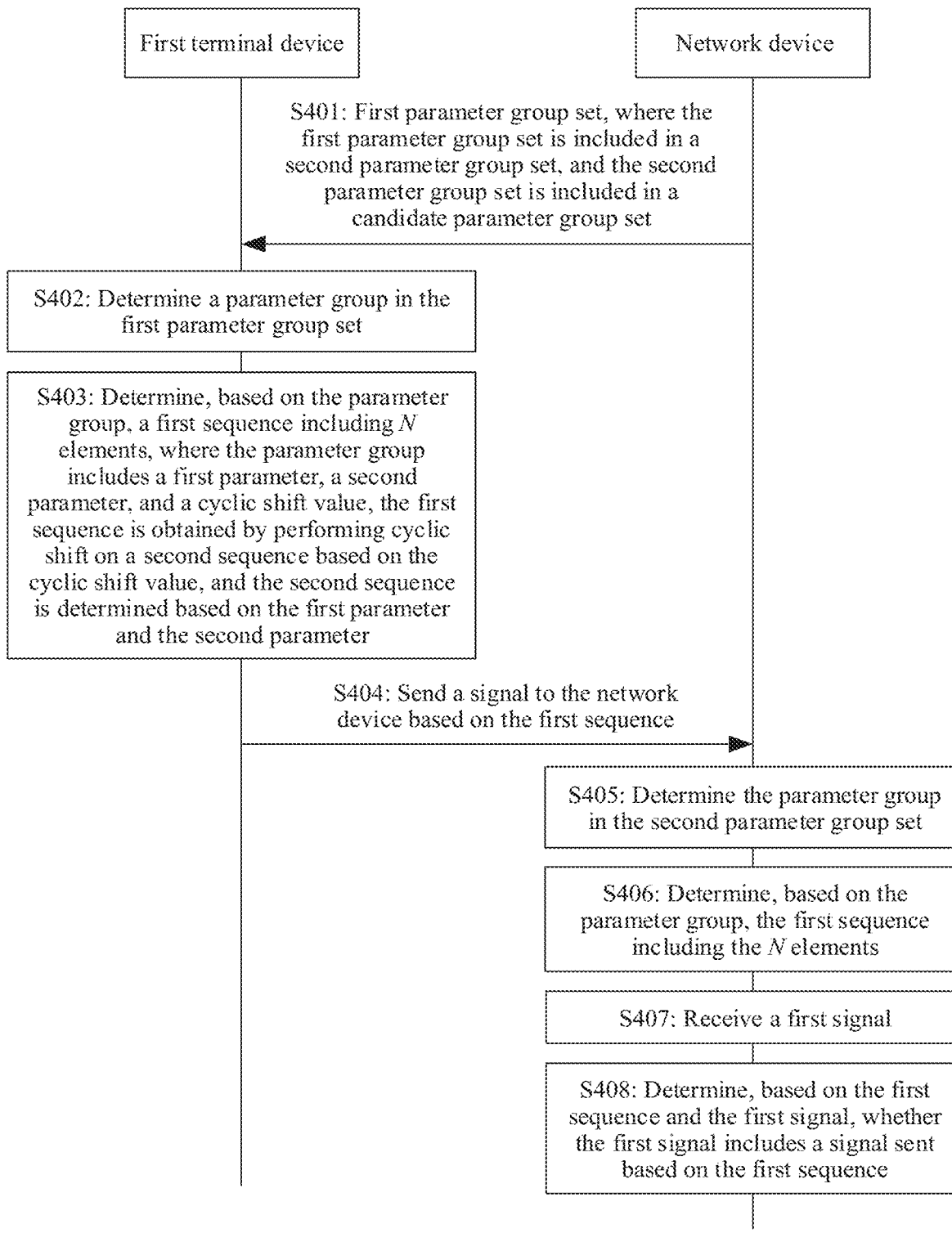
FIG. 4 is a schematic flowchart of still another data processing method according to an embodiment of this application.

FIG. 4 is a schematic flowchart of still another data processing method according to an embodiment of this application. In the method, a grouping rule of parameter groups in a second parameter group set is described in detail. Step S402 to step S404 are performed by a first terminal device or a chip in the first terminal device. Step S401 and step S405 to step S408 are performed by a network device or a chip in the network device. The following uses an example in which the data processing method is performed by the first terminal device and the network device for description. The method may include but is not limited to the following steps.

Step S401: The network device sends a first parameter group set to the first terminal device, where the first parameter group set is included in the second parameter group set, and the second parameter group set is included in a candidate parameter group set, where the candidate parameter group set includes one or more parameter group subsets, a parameter group in each parameter group subset in the candidate parameter group set has a same first parameter, any two parameter groups that belong to different parameter group subsets in the candidate parameter group set have different first parameters, each parameter group subset in the candidate parameter group set includes a parameter groups, and the second parameter group set includes b parameter groups, where when b≤a, the b parameter groups are any b parameter groups in any parameter group subset in the candidate parameter group set; and/or when b>a, the b parameter groups include a parameter group in c parameter group subsets and d parameter groups, the c parameter group subsets are any c parameter group subsets in the candidate parameter group set, and the d parameter groups are any d parameter groups in any parameter group subset other than the c parameter group subsets in the candidate parameter group set, where d<a.

In this embodiment of this application, parameter groups may be grouped into different parameter group subsets based on a first parameter. One parameter group subset in the candidate parameter group set includes a parameter group with a same first parameter (namely, $u_1$), and different parameter group subsets include a same quantity of parameter groups. A cell corresponding to the network device preferably uses a parameter group in a same parameter group subset. If the quantity of parameter groups in the parameter group subset is insufficient, a parameter group in a parameter group subset other than the parameter group subset in the candidate parameter group set continues to be used until the quantity of parameter groups meets a requirement of the cell.

For example, the candidate parameter group set includes M parameter group subsets, each parameter group subset includes A parameter groups, and the cell corresponding to the network device needs B parameter groups. If A≥B, the cell uses a parameter group set in one parameter group subset. If A<B, the parameter groups used by the cell may include the following: all parameter groups in ⌊B/A⌋ parameter group subsets in the candidate parameter group set and (B mod A) parameter groups in another parameter group subset in the candidate parameter group set. In this manner, the cell corresponding to the network device can preferably use the parameter group in the same parameter group subset.

In an implementation, a logical index may be configured for the cell corresponding to the network device. Different logical indexes correspond to different parameter groups, or at least one of first parameters and second parameters that are in the parameter groups and that correspond to different logical indexes is different. The network device may determine a second sequence based on the first parameter and the second parameter that correspond to the logical index. If a quantity of determined second sequences is less than a quantity required by the cell, the network device updates the logical index, and continues to determine the second sequence based on the first parameter and the second parameter that are in the parameter group and that corresponds to an updated logical index until the quantity of determined second sequences meets the requirement of the cell. In an implementation, when the logical index is i, the updated logical index may be i+1.

A correspondence between a first parameter and a second parameter that are in a parameter group and a logical index is shown in Table 1 and is used as an example. It can be learned from Table 1 that logical indexes corresponding to parameter groups having a same first parameter are consecutive (for example, logical indexes corresponding to three parameter groups whose first parameters are 1 are 0 to 2). In this manner, a first parameter in a parameter group corresponding to the updated logical index may be the same as a first parameter in a parameter group corresponding to the logical index before update, that is, the parameter group corresponding to the updated logical index and the parameter group corresponding to the logical index before update belong to a same parameter group subset.

TABLE 1

| Logical index i | First parameter | Second parameter |
| --- | --- | --- |
| 0 | 1 | 0 |
| 1 | 1 | 1 |
| 2 | 1 | 2 |
| 3 | 2 | 0 |
| 4 | 2 | 1 |

TABLE 1-continued

| Logical index i | First parameter | Second parameter |
|---|---|---|
| 5 | 2 | 2 |
| 6 | 3 | 0 |
| 7 | 3 | 1 |
| 8 | 3 | 2 |

It should be noted that Table 1 is merely an example, and does not constitute any limitation on this embodiment of this application. Table 2 is used as an example, in another possible implementation, the logical indexes corresponding to the parameter groups having the same first parameter may be interchanged. For example, it can be learned from Table 2 that logical indexes corresponding to different parameter groups whose first parameters are 3 in Table 1 are interchanged. The parameter groups having the same first parameter are used as a unit, and logical indexes corresponding to parameter groups having different first parameters may be interchanged. For example, it can be learned from Table 2 that, a logical index corresponding to a parameter group whose first parameter is 1 in Table 1 is interchanged with a logical index corresponding to a parameter group whose first parameter is 2. It should be noted that Table 1 and Table 2 use an example in which the parameter group includes the first parameter and the second parameter, and a cyclic shift value is not shown in the tables. This does not constitute any limitation on this embodiment of this application.

TABLE 2

| Logical index i | First parameter | Second parameter |
|---|---|---|
| 0 | 2 | 0 |
| 1 | 2 | 1 |
| 2 | 2 | 2 |
| 3 | 1 | 0 |
| 4 | 1 | 1 |
| 5 | 1 | 2 |
| 6 | 3 | 2 |
| 7 | 3 | 0 |
| 8 | 3 | 1 |

In an implementation, the first parameter group set includes e parameter groups, where e≤b. When b≤a, the e parameter groups are any e parameter groups in the b parameter groups. When b>a and e≤d, the e parameter groups are any e parameter groups in the d parameter groups, or the e parameter groups are any e parameter groups in any one of the c parameter group subsets. When b>a and d<e≤a, the e parameter groups are any e parameter groups in any one of the c parameter group subsets, or the e parameter groups include the d parameter groups and any (e−b) parameter groups in any one of the c parameter group subsets. When b>a and e>a, the e parameter groups include all parameter groups in f parameter group subsets and g parameter groups, where the f parameter group subsets are any f parameter group subsets in the c parameter group subsets, and the g parameter groups are any g parameter groups in any parameter group subset other than the f parameter group subsets in the c parameter group subsets, or the g parameter groups are any g parameter groups in the d parameter groups (when g<d). In this manner, the network device can preferably allocate a parameter group in a same parameter group subset in the second parameter group set to a terminal device.

In an implementation, through implementation of this embodiment of this application, a time domain autocorrelation of a determined first sequence is $1/\sqrt{N}$, that is, the time domain autocorrelation of the determined first sequence is small. In an implementation, according to the grouping rule of the parameter groups in the second parameter group set, a cross-correlation value between first sequences determined based on different parameter groups in a same parameter group subset is $1/\sqrt{N}$, and a cross-correlation value between first sequences determined based on parameter groups in different parameter group subsets is $2/\sqrt{N}$. In this embodiment of this application, a cross-correlation value between determined first sequences used by a same cell is small. This helps reduce interference between different terminal devices in the cell.

Step S402: The first terminal device determines a parameter group in the first parameter group set.

Step S403: The first terminal device determines, based on the parameter group, a first sequence including N elements, where the parameter group includes a first parameter, a second parameter, and a cyclic shift value, the first sequence is obtained by performing cyclic shift on a second sequence based on the cyclic shift value, and the second sequence is determined based on the first parameter and the second parameter, where an element in the second sequence satisfies:

$$x_{u_1,u_2}(i) = \alpha e^{j2\pi\left(\frac{u_1(i \bmod P)^3 + u_2(i \bmod P)}{P} + \varphi\right)}; \text{ or}$$

$$x_{u_1,u_2}(i) = \alpha e^{-j2\pi\left(\frac{u_1(i \bmod P)^3 + u_2(i \bmod P)}{P} + \varphi\right)},$$

where $u_1$ is the first parameter, where $u_1 \in \{1, 2, \ldots, P-1\}$; $u_2$ is the second parameter, where $u_2 \in \{0, 1, 2, \ldots, P-1\}$; i is an index of the element in the second sequence, where a value of i ranges from 0 to N−1; $x_{u_1,u_2}(i)$ is a value of the element whose index of the element is i in the second sequence; N is a length of the second sequence; j is a symbol of an imaginary number in a complex number; α is a non-zero complex number; φ is a real number; and P and N satisfy any one of the following relationships: P is a minimum prime number greater than or equal to N, P is a maximum prime number less than or equal to N, P is a minimum prime number greater than 2×N, or P is a maximum prime number less than 2×N.

Step S404: The first terminal device sends a signal to the network device based on the first sequence.

Step S405: The network device determines the parameter group in the second parameter group set.

Step S406: The network device determines, based on the parameter group, the first sequence including the N elements.

Step S407: The network device receives a first signal.

Step S408: The network device determines, based on the first sequence and the first signal, whether the first signal includes a signal sent based on the first sequence.

It should be noted that, for execution processes of step S401, step S402, and step S405, refer to specific descriptions of step S301, step S302, and step S305 in FIG. 3 respectively. For execution processes of step S403, step S404, and step S406 to step S408, refer to specific descriptions of step S201, step S202, and step S203 to step S205 in FIG. 2 respectively. Details are not described herein again.

Through implementation of this embodiment of this application, the cell corresponding to the network device can preferably use the parameter group in the same parameter group subset.

The foregoing describes in detail the method in embodiments of this application. The following provides an apparatus in embodiments of this application.

Figure 5:
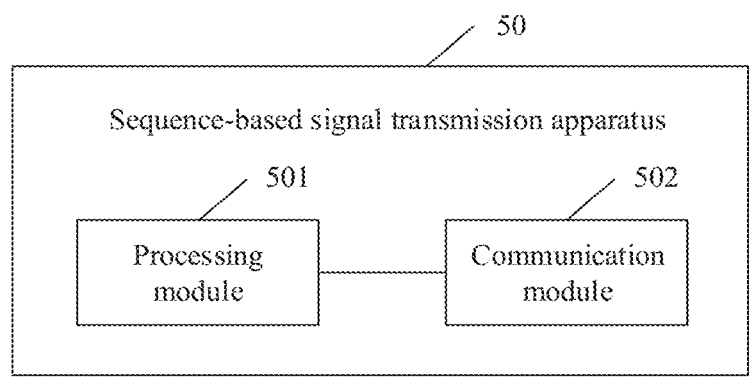
FIG. 5 is a schematic diagram of a structure of a sequence-based signal transmission apparatus according to an embodiment of this application.

FIG. 5 is a schematic diagram of a structure of a sequence-based signal transmission apparatus according to an embodiment of this application. The apparatus may be a first terminal device or an apparatus (for example, a chip) having a function of the first terminal device. The sequence-based signal transmission apparatus 50 is configured to perform the steps performed by the first terminal device in the method embodiments corresponding to FIG. 2 to FIG. 4. The sequence-based signal transmission apparatus 50 includes a processing module 501 and a communication module 502.

The processing module 501 is configured to determine, based on a parameter group, a first sequence including N elements, where the parameter group includes a first parameter, a second parameter, and a cyclic shift value, the first sequence is obtained by performing cyclic shift on a second sequence based on the cyclic shift value, and the second sequence is determined based on the first parameter and the second parameter, where an element in the second sequence satisfies:

$$x_{u_1,u_2}(i) = \alpha e^{j2\pi\left(\frac{u_1(i\bmod P)^3 + u_2(i\bmod P)}{P} + \varphi\right)}; \text{ or}$$

$$x_{u_1,u_2}(i) = \alpha e^{-j2\pi\left(\frac{u_1(i\bmod P)^3 + u_2(i\bmod P)}{P} + \varphi\right)},$$

where $u_1$ is the first parameter, where $u_1 \in \{1, 2, \ldots, P-1\}$; $u_2$ is the second parameter, where $u_2 \in \{0, 1, 2, \ldots, P-1\}$; i is an index of the element in the second sequence, where a value of i ranges from 0 to N−1; $x_{u_1,u_2}(i)$ is a value of the element whose index of the element is i in the second sequence; N is a length of the second sequence; j is a symbol of an imaginary number in a complex number; $\alpha$ is a non-zero complex number; $\varphi$ is a real number; and P and N satisfy any one of the following relationships; P is a minimum prime number greater than or equal to N, P is a maximum prime number less than or equal to N, P is a minimum prime number greater than 2×N, or P is a maximum prime number less than 2×N.

The communication module 502 is configured to send a signal to a network device based on the first sequence.

In an implementation, when both the first parameter and the second parameter that are used by the first terminal device are the same as a first parameter and a second parameter that are used by a second terminal device, an absolute value of a difference between the cyclic shift value used by the first terminal device and a cyclic shift value used by the second terminal device may be greater than a first value, where the first terminal device and the second terminal device are located in a same cell.

In an implementation, when the first parameter used by the first terminal device is the same as a first parameter used by a third terminal device, an absolute value of a difference between the second parameter used by the first terminal device and a second parameter used by the third terminal device may be greater than a second value, where the first terminal device and the third terminal device are located in a same cell.

In an implementation, the communication module 502 may be further configured to receive the parameter group sent by the network device.

In an implementation, the communication module 502 may be further configured to receive a first parameter group set sent by the network device, and the processing module 501 may be further configured to determine the parameter group in the first parameter group set.

In an implementation, in the first parameter group set, an absolute value of a difference between cyclic shift values in any two parameter groups that have same first parameters and same second parameters is greater than the first value.

In an implementation, in the first parameter group set, an absolute value of a difference between second parameters in any two parameter groups that have same first parameters is greater than the second value.

In an implementation, the first parameter group set is included in a second parameter group set, and the second parameter group set is included in a candidate parameter group set. The candidate parameter group set includes one or more parameter group subsets, a parameter group in each parameter group subset in the candidate parameter group set has a same first parameter, any two parameter groups that belong to different parameter group subsets in the candidate parameter group set have different first parameters, each parameter group subset in the candidate parameter group set includes a parameter groups, and the second parameter group set includes b parameter groups. When b≤a, the b parameter groups are any b parameter groups in any parameter group subset in the candidate parameter group set; and/or when b>a, the b parameter groups include a parameter group in c parameter group subsets and d parameter groups, the c parameter group subsets are any c parameter group subsets in the candidate parameter group set, and the d parameter groups are any d parameter groups in any parameter group subset other than the c parameter group subsets in the candidate parameter group set.

In an implementation, when being configured to send the signal to the network device based on the first sequence, the communication module 502 is specifically configured to: perform fast Fourier transform on the first sequence to obtain a frequency domain sequence; map the frequency domain sequence to a subcarrier to obtain the signal; and send the signal to the network device.

It should be noted that, for content that is not mentioned in the embodiment corresponding to FIG. 5 and specific implementations of steps performed by the modules, refer to the embodiments shown in FIG. 2 to FIG. 4 and the foregoing content. Details are not described herein.

Figure 6:
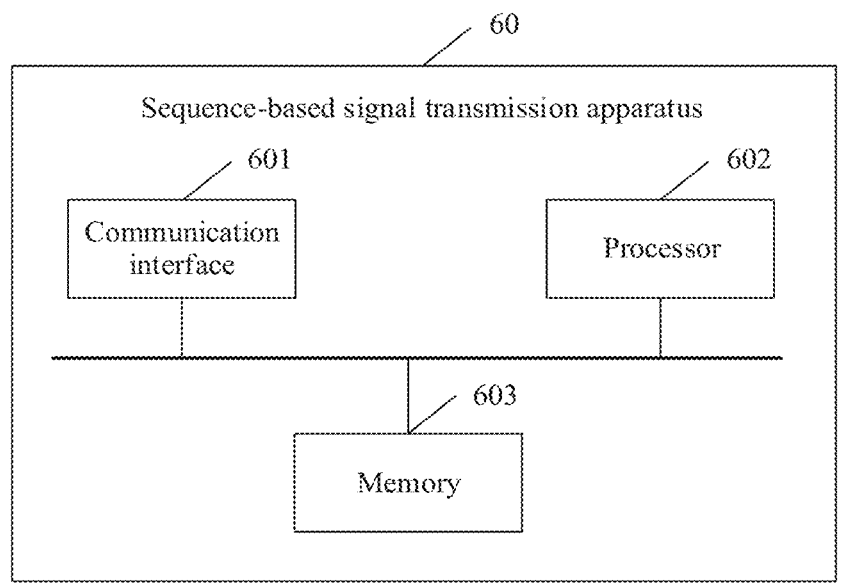
FIG. 6 is a schematic diagram of a structure of another sequence-based signal transmission apparatus according to an embodiment of this application.

In an implementation, related functions implemented by the modules in FIG. 5 may be implemented through a combination of a processor and a communication interface. FIG. 6 is a schematic diagram of a structure of another sequence-based signal transmission apparatus according to an embodiment of this application. The apparatus may be a first terminal device or an apparatus (for example, a chip) having a function of the first terminal device. The sequence-based signal transmission apparatus 60 may include a communication interface 601, a processor 602, and a memory 603. The communication interface 601, the processor 602, and the memory 603 may be connected to each other through one or more communication buses, or may be connected in another manner. Related functions implemented by the processing module 501 and the communication module 502 shown in FIG. 5 may be implemented by the same processor 602, or may be implemented by a plurality of different processors 602.

The communication interface 601 may be configured to send data and/or signaling, and receive data and/or signaling. In this embodiment of this application, the communication interface 601 may be configured to send a signal to a network device. The communication interface 601 may be a transceiver.

The processor 602 is configured to perform corresponding functions of the first terminal device in the methods in FIG. 2 to FIG. 4. The processor 602 may include one or more processors. For example, the processor 602 may be one or more of a central processing unit (CPU), a network processor (NP), a hardware chip, or any combination thereof. When the processor 602 is one CPU, the CPU may be a single-core CPU, or may be a multi-core CPU.

The memory 603 is configured to store program code and the like. The memory 603 may include a volatile memory such as a random access memory (RAM), or the memory 603 may include a non-volatile memory such as a read-only memory (ROM), a flash memory, a hard disk drive (HDD), or a solid-state drive (SSD), or the memory 603 may include a combination of the foregoing types of memories. It should be noted, that the sequence-based signal transmission apparatus 60 includes the memory 603 is merely used as an example, and does not constitute any limitation on this embodiment of this application. In an implementation, the memory 603 may be replaced with another storage medium having a storage function.

The processor 602 may invoke the program code stored in the memory 603, so that the sequence-based signal transmission apparatus 60 performs the following operations: determining, based on a parameter group, a first sequence including N elements; and sending the signal to the network device based on the first sequence, where the parameter group includes a first parameter, a second parameter, and a cyclic shift value, the first sequence is obtained by performing cyclic shift on a second sequence based on the cyclic shift value, and the second sequence is determined based on the first parameter and the second parameter, where an element in the second sequence satisfies:

$$x_{u_1,u_2}(i) = \alpha e^{j2\pi\left(\frac{u_1(i \bmod P)^3 + u_2(i \bmod P)}{P} + \varphi\right)}; \text{ or}$$

$$x_{u_1,u_2}(i) = \alpha e^{-j2\pi\left(\frac{u_1(i \bmod P)^3 + u_2(i \bmod P)}{P} + \varphi\right)},$$

where $u_1$ is the first parameter, where $u_1 \in \{1, 2, \ldots, P-1\}$; $u_2$ is the second parameter, where $u_2 \in \{0, 1, 2, \ldots, P-1\}$; i is an index of the element in the second sequence, where a value of i ranges from 0 to N−1; $x_{u_1,u_2}(i)$ is a value of the element whose index of the element is i in the second sequence; N is a length of the second sequence; j is a symbol of an imaginary number in a complex number; $\alpha$ is a non-zero complex number; $\varphi$ is a real number; and P and N satisfy any one of the following relationships: P is a minimum prime number greater than or equal to N, P is a maximum prime number less than or equal to N, P is a minimum prime number greater than 2×N, or P is a maximum prime number less than 2×N.

In an implementation, when both the first parameter and the second parameter that are used by the first terminal device are the same as a first parameter and a second parameter that are used by a second terminal device, an absolute value of a difference between the cyclic shift value used by the first terminal device and a cyclic shift value used by the second terminal device may be greater than a first value, where the first terminal device and the second terminal device are located in a same cell.

In an implementation, when the first parameter used by the first terminal device is the same as a first parameter used by a third terminal device, an absolute value of a difference between the second parameter used by the first terminal device and a second parameter used by the third terminal device may be greater than a second value, where the first terminal device and the third terminal device are located in a same cell.

In an implementation, the processor 602 may further invoke the program code stored in the memory 603, so that the sequence-based signal transmission apparatus 60 performs the following operation: receiving, through the communication interface 601, a parameter group sent by the network device.

In an implementation, the processor 602 may further invoke the program code stored in the memory 603, so that the sequence-based signal transmission apparatus 60 performs the following operations: receiving, through the communication interface 601, a first parameter group set sent by the network device; and determining the parameter group in the first parameter group set.

In an implementation, in the first parameter group set, an absolute value of a difference between cyclic shift values in any two parameter groups that have same first parameters and same second parameters is greater than the first value.

In an implementation, in the first parameter group set, an absolute value of a difference between second parameters in any two parameter groups that have same first parameters is greater than the second value.

In an implementation, the first parameter group set is included in a second parameter group set, and the second parameter group set is included in a candidate parameter group set. The candidate parameter group set includes one or more parameter group subsets, a parameter group in each parameter group subset in the candidate parameter group set has a same first parameter, any two parameter groups that belong to different parameter group subsets in the candidate parameter group set have different first parameters, each parameter group subset in the candidate parameter group set includes a parameter groups, and the second parameter group set includes b parameter groups. When b≤a, the b parameter groups are any b parameter groups in any parameter group subset in the candidate parameter group set; and/or when b>a, the b parameter groups include a parameter group in c parameter group subsets and d parameter groups, the c parameter group subsets are any c parameter group subsets in the candidate parameter group set, and the d parameter groups are any d parameter groups in any parameter group subset other than the c parameter group subsets in the candidate parameter group set.

In an implementation, when sending the signal to the network device based on the first sequence, the processor 602 may specifically perform the following operations: performing fast Fourier transform on the first sequence to obtain a frequency domain sequence; mapping the frequency domain sequence to a subcarrier to obtain the signal; and sending the signal to the network device through the communication interface 601.

Further, the processor 602 may further perform operations corresponding to the first terminal device in the embodiments shown in FIG. 2 to FIG. 4. For details, refer to descriptions in the method embodiments, and details are not described herein again.

Figure 7:
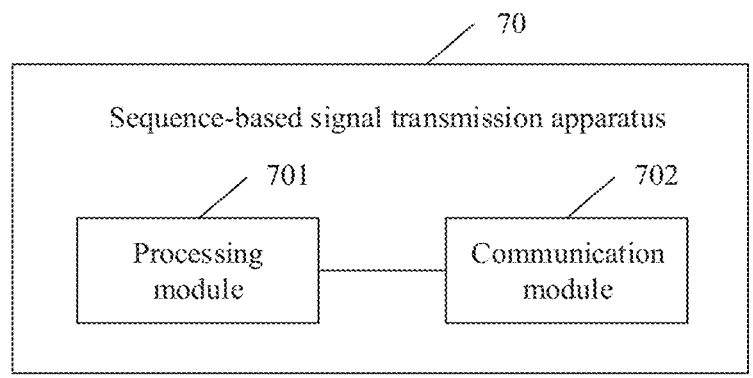
FIG. 7 is a schematic diagram of a structure of still another sequence-based signal transmission apparatus according to an embodiment of this application.

FIG. 7 is a schematic diagram of a structure of still another sequence-based signal transmission apparatus according to an embodiment of this application. The apparatus may be a network device or an apparatus (for example, a chip) having a function of the network device. The sequence-based signal transmission apparatus 70 is configured to perform the steps performed by the network device in the method embodiments corresponding to FIG. 2 to FIG. 4. The sequence-based signal transmission apparatus 70 may include a processing module 701 and a communication module 702.

The processing module 701 is configured to determine, based on a parameter group, a first sequence including N elements, where the parameter group includes a first parameter, a second parameter, and a cyclic shift value, the first sequence is obtained by performing cyclic shift on a second sequence based on the cyclic shift value, and the second sequence is determined based on the first parameter and the second parameter.

The communication module 702 is configured to receive a first signal.

The processing module 701 is further configured to determine, based on the first sequence and the first signal, whether the first signal includes a signal sent based on the first sequence, where an element in the second sequence satisfies:

$$x_{u_1,u_2}(i) = \alpha e^{j2\pi\left(\frac{u_1(i\bmod P)^3 + u_2(i\bmod P)}{P} + \varphi\right)}; \text{ or}$$

$$x_{u_1,u_2}(i) = \alpha e^{-j2\pi\left(\frac{u_1(i\bmod P)^3 + u_2(i\bmod P)}{P} + \varphi\right)},$$

where
$u_1$ is the first parameter, where $u_1 \in \{1, 2, \ldots, P-1\}$; $u_2$ is the second parameter, where $u_2 \in \{0, 1, 2, \ldots, P-1\}$; i is an index of the element in the second sequence, where a value of i ranges from 0 to N−1; $x_{u_1,u_2}(i)$ is a value of the element whose index of the element is i in the second sequence; N is a length of the second sequence; j is a symbol of an imaginary number in a complex number; α is a non-zero complex number; φ is a real number; and P and N satisfy any one of the following relationships: P is a minimum prime number greater than or equal to N, P is a maximum prime number less than or equal to N, P is a minimum prime number greater than 2×N, or P is a maximum prime number less than 2×N.

In an implementation, the communication module 702 may further be configured to separately send a parameter group to a first terminal device and a second terminal device. When both a first parameter and a second parameter in the parameter group sent to the first terminal device are the same as a first parameter and a second parameter in the parameter group sent to the second terminal device, an absolute value of a difference between a cyclic shift value in the parameter group sent to the first terminal device and a cyclic shift value in the parameter group sent to the second terminal device is greater than a first value, where the first terminal device and the second terminal device are located in a same cell.

In an implementation, the communication module 702 may further be configured to separately send a parameter group to the first terminal device and a third terminal device. When the first parameter in the parameter group sent to the first terminal device is the same as a first parameter in the parameter group sent to the third terminal device, an absolute value of a difference between the second parameter in the parameter group sent to the first terminal device and a second parameter in the parameter group sent to the third terminal device is greater than a second value, where the first terminal device and the second terminal device are located in a same cell.

In an implementation, the communication module 702 may be further configured to send a first parameter group set to the first terminal device, and the processing module 701 may be further configured to determine the parameter group in a second parameter group set, where the first parameter group set is included in the second parameter group set.

In an implementation, in the first parameter group set, an absolute value of a difference between cyclic shift values in any two parameter groups that have same first parameters and same second parameters is greater than the first value.

In an implementation, in the first parameter group set, an absolute value of a difference between second parameters in any two parameter groups that have same first parameters is greater than the second value.

In an implementation, the second parameter group set is included in a candidate parameter group set. The candidate parameter group set includes one or more parameter group subsets, a parameter group in each parameter group subset in the candidate parameter group set has a same first parameter, any two parameter groups that belong to different parameter group subsets in the candidate parameter group set have different first parameters, each parameter group subset in the candidate parameter group set includes a parameter groups, and the second parameter group set includes b parameter groups. When b≤a, the b parameter groups are any b parameter groups in any parameter group subset in the candidate parameter group set; and/or when b>a, the b parameter groups include a parameter group in c parameter group subsets and d parameter groups, the c parameter group subsets are any c parameter group subsets in the candidate parameter group set, and the d parameter groups are any d parameter groups in any parameter group subset other than the c parameter group subsets in the candidate parameter group set.

In an implementation, when being configured to determine, based on the first sequence and the first signal, whether the first signal includes the signal sent based on the first sequence, the processing module 701 may be specifically configured to: perform inverse fast Fourier transform on a frequency domain sequence carried by a subcarrier in the first signal to obtain a time domain sequence; perform correlation processing on the first sequence and the time domain sequence to obtain a correlation value; and determine, based on the correlation value, whether the first signal includes the signal sent based on the first sequence.

It should be noted that, for content that is not mentioned in the embodiment corresponding to FIG. 7 and specific implementations of steps performed by the modules, refer to the embodiments shown in FIG. 2 to FIG. 4 and the foregoing content. Details are not described herein.

Figure 8:
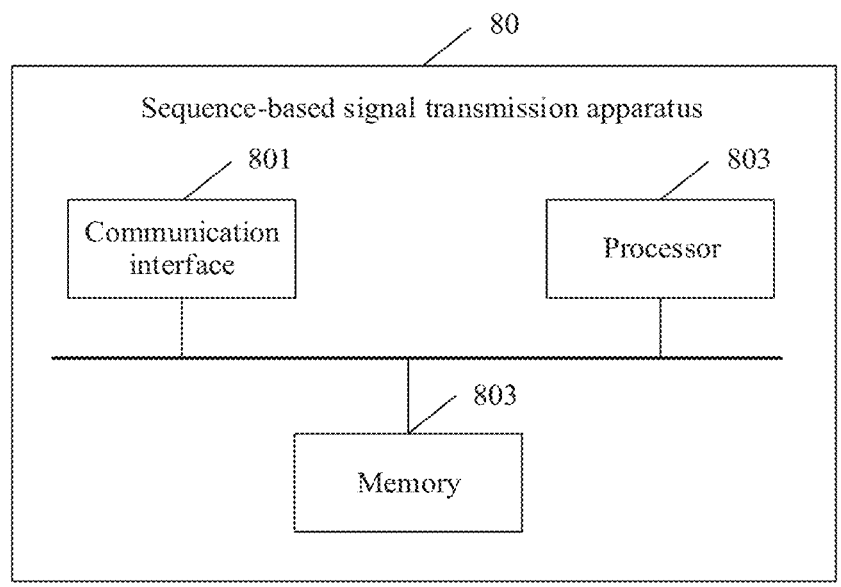
FIG. 8 is a schematic diagram of a structure of still another sequence-based signal transmission apparatus according to an embodiment of this application.

In an implementation, related functions implemented by the modules in FIG. 7 may be implemented through a combination of a processor and a communication interface. FIG. 8 is a schematic diagram of a structure of still another sequence-based signal transmission apparatus according to an embodiment of this application. The apparatus may be a network device or an apparatus (for example, a chip) having a function of the network device. The sequence-based signal transmission apparatus 80 may include a communication interface 801, a processor 802, and a memory 803. The communication interface 801, the processor 802, and the memory 803 may be connected to each other through one or more communication buses, or may be connected in another manner. Related functions implemented by the processing module 701 and the communication module 702 shown in FIG. 7 may be implemented by the same processor 802, or may be implemented by a plurality of different processors 802.

The communication interface 801 may be configured to send data and/or signaling, and receive data and/or signaling. In this embodiment of this application, the communication interface 801 may be configured to receive a first signal. The communication interface 801 may be a transceiver.

The processor 802 is configured to perform corresponding functions of the network device in the methods in FIG. 2 to FIG. 4. The processor 802 may include one or more processors. For example, the processor 802 may be one or more of a central processing unit (CPU), a network processor (NP), a hardware chip, or any combination thereof. When the processor 802 is one CPU, the CPU may be a single-core CPU, or may be a multi-core CPU.

The memory 803 is configured to store program code and the like. The memory 803 may include a volatile memory such as a random access memory (RAM), or the memory 803 may include a non-volatile memory such as a read-only memory (ROM), a flash memory, a hard disk drive (HDD), or a solid-state drive (SSD), or the memory 803 may include a combination of the foregoing types of memories. It should be noted, that the sequence-based signal transmission apparatus 80 includes the memory 803 is merely used as an example, and does not constitute any limitation on this embodiment of this application. In an implementation, the memory 803 may be replaced with another storage medium having a storage function.

The processor 802 may invoke the program code stored in the memory 803, so that the sequence-based signal transmission apparatus 80 performs the following operations:
determining, based on a parameter group, a first sequence including N elements, where the parameter group includes a first parameter, a second parameter, and a cyclic shift value, the first sequence is obtained by performing cyclic shift on a second sequence based on the cyclic shift value, and the second sequence is determined based on the first parameter and the second parameter;
receiving the first signal through the communication interface 801; and
determining, based on the first sequence and the first signal, whether the first signal includes a signal sent based on the first sequence, where an element in the second sequence satisfies:

$$x_{u_1,u_2}(i) = \alpha e^{j2\pi\left(\frac{u_1(i\bmod P)^3 + u_2(i\bmod P)}{P} + \varphi\right)}; \text{ or}$$

$$x_{u_1,u_2}(i) = \alpha e^{-j2\pi\left(\frac{u_1(i\bmod P)^3 + u_2(i\bmod P)}{P} + \varphi\right)},$$

where
$u_1$ is the first parameter, where $u_1 \in \{1, 2, \ldots, P-1\}$; $u_2$ is the second parameter, where $u_2 \in \{0, 1, 2, \ldots, P-1\}$; i is an index of the element in the second sequence, where a value of i ranges from 0 to N−1; $x_{u_1,u_2}(i)$ is a value of the element whose index of the element is i in the second sequence; N is a length of the second sequence; j is a symbol of an imaginary number in a complex number; $\alpha$ is a non-zero complex number; $\varphi$ is a real number; and P and N satisfy any one of the following relationships: P is a minimum prime number greater than or equal to N, P is a maximum prime number less than or equal to N, P is a minimum prime number greater than 2×N, or P is a maximum prime number less than 2×N.

In an implementation, the processor 802 may further invoke the program code stored in the memory 803, so that the sequence-based signal transmission apparatus 80 performs the following operation: separately sending a parameter group to a first terminal device and a second terminal device through the communication interface 801. When both a first parameter and a second parameter in the parameter group sent to the first terminal device are the same as a first parameter and a second parameter in the parameter group sent to the second terminal device, an absolute value of a difference between a cyclic shift value in the parameter group sent to the first terminal device and a cyclic shift value in the parameter group sent to the second terminal device is greater than a first value, where the first terminal device and the second terminal device are located in a same cell.

In an implementation, the processor 802 may further invoke the program code stored in the memory 803, so that the sequence-based signal transmission apparatus 80 performs the following operation: separately sending a parameter group to the first terminal device and a third terminal device through the communication interface 801. When the first parameter in the parameter group sent to the first terminal device is the same as a first parameter in the parameter group sent to the third terminal device, an absolute value of a difference between the second parameter in the parameter group sent to the first terminal device and a second parameter in the parameter group sent to the third terminal device is greater than a second value, where the first terminal device and the second terminal device are located in a same cell.

In an implementation, the processor 802 may further invoke the program code stored in the memory 803, so that the sequence-based signal transmission apparatus 80 performs the following operations: sending a first parameter group set to the first terminal device through the communication interface 801; and determining the parameter group in a second parameter group set, where the first parameter group set is included in the second parameter group set.

In an implementation, in the first parameter group set, an absolute value of a difference between cyclic shift values in any two parameter groups that have same first parameters and same second parameters is greater than the first value.

In an implementation, in the first parameter group set, an absolute value of a difference between second parameters in any two parameter groups that have same first parameters is greater than the second value.

In an implementation, the second parameter group set is included in a candidate parameter group set. The candidate parameter group set includes one or more parameter group subsets, a parameter group in each parameter group subset in the candidate parameter group set has a same first parameter, any two parameter groups that belong to different parameter group subsets in the candidate parameter group set have different first parameters, each parameter group subset in the candidate parameter group set includes a parameter groups, and the second parameter group set includes b parameter groups. When b≤a, the b parameter groups are any b parameter groups in any parameter group subset in the candidate parameter group set; and/or when b>a, the b parameter groups include a parameter group in c parameter group subsets and d parameter groups, the c parameter group subsets are any c parameter group subsets in the candidate parameter group set, and the d parameter groups are any d parameter groups in any parameter group subset other than the c parameter group subsets in the candidate parameter group set.

In an implementation, when being configured to determine, based on the first sequence and the first signal, whether the first signal includes the signal sent based on the first sequence, the processor 802 may be specifically configured to perform the following operations: performing inverse fast Fourier transform on a frequency domain sequence carried by a subcarrier in the first signal to obtain a time domain sequence; performing correlation processing on the first sequence and the time domain sequence to obtain a correlation value; and determining, based on the correlation value, whether the first signal includes the signal sent based on the first sequence.

Further, the processor 802 may further perform operations corresponding to the network device in the embodiments shown in FIG. 2 to FIG. 4. For details, refer to descriptions in the method embodiments, and details are not described herein again.

An embodiment of this application further provides a computer-readable storage medium. The computer-readable storage medium may be configured to store computer software instructions used by the sequence-based signal transmission apparatus in the embodiment shown in FIG. 5. The computer-readable storage medium includes a program designed for the first terminal device in the foregoing embodiments.

An embodiment of this application further provides a computer-readable storage medium. The computer-readable storage medium may be configured to store computer software instructions used by the sequence-based signal transmission apparatus in the embodiment shown in FIG. 7. The computer-readable storage medium includes a program designed for the network device in the foregoing embodiments.

The foregoing computer-readable storage medium includes but is not limited to a flash memory, a hard disk drive, and a solid-state drive.

An embodiment of this application further provides a computer program product. When the computer product runs on a computing device, the methods designed for the first terminal device in the embodiments in FIG. 2 to FIG. 4 may be performed.

An embodiment of this application further provides a computer program product. When the computer product runs on a computing device, the methods designed for the network device in the embodiments in FIG. 2 to FIG. 4 may be performed.

An embodiment of this application further provides a chip, including a processor and a memory. The memory includes the processor and the memory. The memory is configured to store a computer program. The processor is configured to invoke the computer program from the memory and run the computer program. The computer program is for implementing the methods in the foregoing method embodiments.

A person skilled in the art may be aware that units and algorithm steps in the examples described with reference to embodiments disclosed in this application may be implemented by electronic hardware or a combination of computer software and electronic hardware. Whether the functions are executed by hardware or software depends on particular applications and design constraints of the technical solutions. A person skilled in the art may use different methods to implement the described functions for each particular application, but it should not be considered that the implementation goes beyond the scope of this application.

All or some of the foregoing embodiments may be implemented by using software, hardware, firmware, or any combination thereof. When the software is for implementing the embodiments, all or some of the embodiments may be implemented in a form of a computer program product. The computer program product includes one or more computer instructions. When the computer instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data processing method, wherein the method comprises:
   determining, by a first terminal device based on a parameter group, a first sequence comprising N elements, wherein the parameter group comprises a first parameter, a second parameter, and a cyclic shift value, the first sequence is obtained by performing cyclic shift on a second sequence based on the cyclic shift value, and the second sequence is determined based on the first parameter and the second parameter; and
   sending, by the first terminal device, a signal to a network device based on the first sequence, wherein an element in the second sequence satisfies:

$$x_{u_1,u_2}(i) = \alpha e^{j2\pi\left(\frac{u_1(i\bmod P)^3 + u_2(i\bmod P)}{P} + \varphi\right)}; \text{ or}$$

$$x_{u_1,u_2}(i) = \alpha e^{-j2\pi\left(\frac{u_1(i\bmod P)^3 + u_2(i\bmod P)}{P} + \varphi\right)},$$

wherein:
   $u_1$ is the first parameter, wherein $u_1 \in \{1, 2, \ldots, P-1\}$;

u₂ is the second parameter, wherein $u_2 \in \{0, 1, 2, \ldots, P-1\}$;

i is an index of the element in the second sequence, wherein a value of i ranges from 0 to N−1;

$x_{u_1,u_2}(i)$ is a value of the element whose index of the element is i in the second sequence;

N is a length of the second sequence;

j is a symbol of an imaginary number in a complex number;

P and N satisfy any one of the following relationships: P is a minimum prime number greater than or equal to N, P is a maximum prime number less than or equal to N, P is a minimum prime number greater than 2×N, or P is a maximum prime number less than 2×N;

α is a non-zero complex number; and

φ is a real number.

2. The method according to claim 1, wherein when both the first parameter and the second parameter are the same as a first parameter and a second parameter that are used by a second terminal device, an absolute value of a difference between the cyclic shift value and a cyclic shift value used by the second terminal device is greater than a first value, wherein the first terminal device and the second terminal device are located in a same cell.

3. The method according to claim 1, wherein when the first parameter is the same as a first parameter used by a third terminal device, an absolute value of a difference between the second parameter used by the first terminal device and a second parameter used by the third terminal device is greater than a second value, wherein the first terminal device and the third terminal device are located in a same cell.

4. The method according to claim 1, wherein the method further comprises:

receiving, by the first terminal device, the parameter group sent by the network device.

5. The method according to claim 1, wherein the method further comprises:

receiving, by the first terminal device, a first parameter group set sent by the network device; and determining, by the first terminal device, the parameter group in the first parameter group set.

6. The method according to claim 5, wherein in the first parameter group set, an absolute value of a difference between cyclic shift values in any two parameter groups that have same first parameters and same second parameters is greater than a first value.

7. The method according to claim 5, wherein in the first parameter group set, an absolute value of a difference between second parameters in any two parameter groups that have same first parameters is greater than a second value.

8. The method according to claim 5, wherein the first parameter group set is comprised in a second parameter group set, and the second parameter group set is comprised in a candidate parameter group set, wherein the candidate parameter group set comprises one or more parameter group subsets, any two parameter groups in each parameter group subset in the candidate parameter group set have a same first parameter, any two parameter groups that belong to different parameter group subsets in the candidate parameter group set have different first parameters, each parameter group subset in the candidate parameter group set comprises a parameter groups, and the second parameter group set comprises b parameter groups; and when b≤a, the b parameter groups are any b parameter groups in any parameter group subset in the candidate parameter group set; or when b>a, the b parameter groups comprise a parameter group in c parameter group subsets and d parameter groups, the c parameter group subsets are any c parameter group subsets in the candidate parameter group set, and the d parameter groups are any d parameter groups in any parameter group subset other than the c parameter group subsets in the candidate parameter group set.

9. The method according to claim 1, wherein the sending, by the first terminal device, a signal to a network device based on the first sequence comprises:

performing, by the first terminal device, fast Fourier transform on the first sequence to obtain a frequency domain sequence;

mapping, by the first terminal device, the frequency domain sequence to a subcarrier to obtain the signal; and sending, by the first terminal device, the signal to the network device.

10. A data processing method, wherein the method comprises:

determining, by a network device based on a parameter group, a first sequence comprising N elements, wherein the parameter group comprises a first parameter, a second parameter, and a cyclic shift value, the first sequence is obtained by performing cyclic shift on a second sequence based on the cyclic shift value, and the second sequence is determined based on the first parameter and the second parameter;

receiving, by the network device, a first signal; and determining, by the network device based on the first sequence and the first signal, whether the first signal comprises a signal sent based on the first sequence, wherein an element in the second sequence satisfies:

$$x_{u_1,u_2}(i) = \alpha e^{j2\pi\left(\frac{u_1(i \bmod P)^3 + u_2(i \bmod P)}{P} + \varphi\right)}; \text{ or}$$

$$x_{u_1,u_2}(i) = \alpha e^{-j2\pi\left(\frac{u_1(i \bmod P)^3 + u_2(i \bmod P)}{P} + \varphi\right)},$$

wherein u₁ is the first parameter, wherein $u_1 \in \{1, 2, \ldots, P-1\}$;

u₂ is the second parameter, wherein $u_2 \in \{0, 1, 2, \ldots, P-1\}$;

i is an index of the element in the second sequence, wherein a value of i ranges from 0 to N−1;

$x_{u_1,u_2}(i)$ is a value of the element whose index of the element is i in the second sequence;

N is a length of the second sequence;

j is a symbol of an imaginary number in a complex number;

P and N satisfy any one of the following relationships: P is a minimum prime number greater than or equal to N, P is a maximum prime number less than or equal to N, P is a minimum prime number greater than 2×N, or P is a maximum prime number less than 2×N;

α is a non-zero complex number; and

φ is areal number.

11. The method according to claim 10, wherein the method further comprises:

sending, by the network device, a first parameter group to a first terminal device; and sending, by the network device, a second parameter group to a second terminal device, wherein when both a first parameter and a second parameter in the first parameter group are the same as a first parameter and a second parameter in the second parameter group, an absolute value of a difference between a cyclic shift value in the first parameter group and a cyclic shift value in the second parameter group is greater than a first value, wherein the first terminal device and the second terminal device are located in a same cell.

12. A sequence-based signal transmission apparatus, comprising:
at least one processor;
one or more memories coupled to the at least one processor and storing programming instructions for execution by the at least one processor to:
   determine, by a first terminal device based on a parameter group, a first sequence comprising N elements, wherein the parameter group comprises a first parameter, a second parameter, and a cyclic shift value, the first sequence is obtained by performing cyclic shift on a second sequence based on the cyclic shift value, and the second sequence is determined based on the first parameter and the second parameter; and
   send, by the first terminal device, a signal to a network device based on the first sequence, wherein an element in the second sequence satisfies:

$$x_{u_1,u_2}(i) = \alpha e^{j2\pi\left(\frac{u_1(i\bmod P)^3 + u_2(i\bmod P)}{P} + \varphi\right)}; \text{ or}$$

$$x_{u_1,u_2}(i) = \alpha e^{-j2\pi\left(\frac{u_1(i\bmod P)^3 + u_2(i\bmod P)}{P} + \varphi\right)},$$

wherein:
$u_1$ is the first parameter, wherein $u_1 \in \{1, 2, \ldots, P-1\}$;
$u_2$ is the second parameter, wherein $u_2 \in \{0, 1, 2, \ldots, P-1\}$;
i is an index of the element in the second sequence, wherein a value of i ranges from 0 to N−1;
$x_{u_1,u_2}(i)$ is a value of the element whose index of the element is i in the second sequence;
N is a length of the second sequence;
j is a symbol of an imaginary number in a complex number;
P and N satisfy any one of the following relationships: P is a minimum prime number greater than or equal to N, P is a maximum prime number less than or equal to N, P is a minimum prime number greater than 2×N, or P is a maximum prime number less than 2×N;
α is a non-zero complex number; and
φ is a real number.

13. The apparatus according to claim 12, wherein when both the first parameter and the second parameter are the same as a first parameter and a second parameter that are used by a second terminal device, an absolute value of a difference between the cyclic shift value and a cyclic shift value used by the second terminal device is greater than a first value, wherein the first terminal device and the second terminal device are located in a same cell.

14. The apparatus according to claim 12, wherein when the first parameter is the same as a first parameter used by a third terminal device, an absolute value of a difference between the second parameter used by the first terminal device and a second parameter used by the third terminal device is greater than a second value, wherein the first terminal device and the third terminal device are located in a same cell.

15. The apparatus according to claim 12, wherein the programming instructions are for execution by the at least one processor to:
receive, by the first terminal device, the parameter group sent by the network device.

16. The apparatus according to claim 12, wherein the programming instructions are for execution by the at least one processor to:
receive, by the first terminal device, a first parameter group set sent by the network device; and
determine, by the first terminal device, the parameter group in the first parameter group set.

17. The apparatus according to claim 16, wherein
in the first parameter group set, an absolute value of a difference between cyclic shift values in any two parameter groups that have same first parameters and same second parameters is greater than a first value.

18. The apparatus according to claim 16, wherein
in the first parameter group set, an absolute value of a difference between second parameters in any two parameter groups that have same first parameters is greater than a second value.

19. The apparatus according to claim 16, wherein the first parameter group set is comprised in a second parameter group set, and the second parameter group set is comprised in a candidate parameter group set, wherein
the candidate parameter group set comprises one or more parameter group subsets, any two parameter groups in each parameter group subset in the candidate parameter group set have a same first parameter, any two parameter groups that belong to different parameter group subsets in the candidate parameter group set have different first parameters, each parameter group subset in the candidate parameter group set comprises a parameter groups, and the second parameter group set comprises b parameter groups; and
when b≤a, the b parameter groups are any b parameter groups in any parameter group subset in the candidate parameter group set; or
when b>a, the b parameter groups comprise a parameter group in c parameter group subsets and d parameter groups, the c parameter group subsets are any c parameter group subsets in the candidate parameter group set, and the d parameter groups are any d parameter groups in any parameter group subset other than the c parameter group subsets in the candidate parameter group set.

20. The apparatus according to claim 12, wherein sending, by the first terminal device, the signal to the network device based on the first sequence comprises:
performing, by the first terminal device, fast Fourier transform on the first sequence to obtain a frequency domain sequence;
mapping, by the first terminal device, the frequency domain sequence to a subcarrier to obtain the signal; and
sending, by the first terminal device, the signal to the network device.

* * * * *

UNITED STATES PATENT AND TRADEMARK OFFICE
CERTIFICATE OF CORRECTION

PATENT NO. : 12,063,132 B2
APPLICATION NO. : 17/731188
DATED : August 13, 2024
INVENTOR(S) : Mingxin Gong and Bingyu Qu It is certified that error appears in the above-identified patent and that said Letters Patent is hereby corrected as shown below:

In the Claims

In Column 34, In Line 63, In Claim 10, delete "areal" and insert -- a real --.

In Column 35, In Line 54, In Claim 12, delete "areal" and insert -- a real --.

Signed and Sealed this
Nineteenth Day of November, 2024

Katherine Kelly Vidal
*Director of the United States Patent and Trademark Office*